(12) United States Patent
Ellinger et al.

(10) Patent No.: US 12,546,770 B2
(45) Date of Patent: Feb. 10, 2026

(54) MICROCAPSULE FOR DETECTING AND/OR QUANTITATING AN ANALYTE IN A SAMPLE

(71) Applicant: BLINK AG, Jena (DE)

(72) Inventors: Thomas Ellinger, Jena (DE); Stephan Hubold, Jena (DE); Ivan Loncarevic, Jena (DE); Torsten Schulz, Jena (DE); Katrin Steinmetzer, Jena (DE); Eugen Ermantraut, Jena (DE); Lea Kanitz, Jena (DE); Oliver Lemuth, Jena (DE)

(73) Assignee: BLINK AG, Jena (DE)

( * ) Notice: Subject to any disclaimer, the term of this patent is extended or adjusted under 35 U.S.C. 154(b) by 265 days.

(21) Appl. No.: 16/772,495

(22) PCT Filed: Dec. 19, 2018

(86) PCT No.: PCT/EP2018/085880
§ 371 (c)(1),
(2) Date: Jun. 12, 2020

(87) PCT Pub. No.: WO2019/129580
PCT Pub. Date: Jul. 4, 2019

(65) Prior Publication Data
US 2020/0333333 A1 Oct. 22, 2020

(30) Foreign Application Priority Data
Dec. 29, 2017 (EP) .................................... 17211031

(51) Int. Cl.
*G01N 33/543* (2006.01)

(52) U.S. Cl.
CPC ... *G01N 33/5432* (2013.01); *G01N 33/54306* (2013.01)

(58) Field of Classification Search
CPC ......... G01N 33/5432; G01N 33/54306; G01N 33/54313
See application file for complete search history.

(56) References Cited

U.S. PATENT DOCUMENTS

| | | | |
|---|---|---|---|
| 4,483,928 A | 11/1984 | Suzuta et al. | |
| 2011/0003699 A1* | 1/2011 | Yoder | B01L 7/52 |
| | | | 506/40 |

FOREIGN PATENT DOCUMENTS

| | | |
|---|---|---|
| CN | 1656234 A | 8/2005 |
| CN | 104769127 A | 7/2015 |

(Continued)

OTHER PUBLICATIONS

Park et al. "Magnetic nanoparticle-embedded PCM nanoparticles based on paraffin core and polyurea shell", Colloids and Surfaces A: Physicochem. Eng. Aspects, vol. 450, pp. 46-51, published Mar. 12, 2014 (Year: 2014).*

(Continued)

*Primary Examiner* — Shafiqul Haq
*Assistant Examiner* — Nam P Nguyen
(74) *Attorney, Agent, or Firm* — SALIWANCHIK, LLOYD & EISENSCHENK

(57) ABSTRACT

The present invention relates to a microcapsule for detecting and/or quantitating an analyte in a sample. Furthermore, the invention relates to a method of detecting and/quantitating an analyte in a sample using said microcapsule. Moreover, the present invention relates to a method of preparing microcapsules for detecting and/or quantitating an analyte in a sample.

Figure 1:
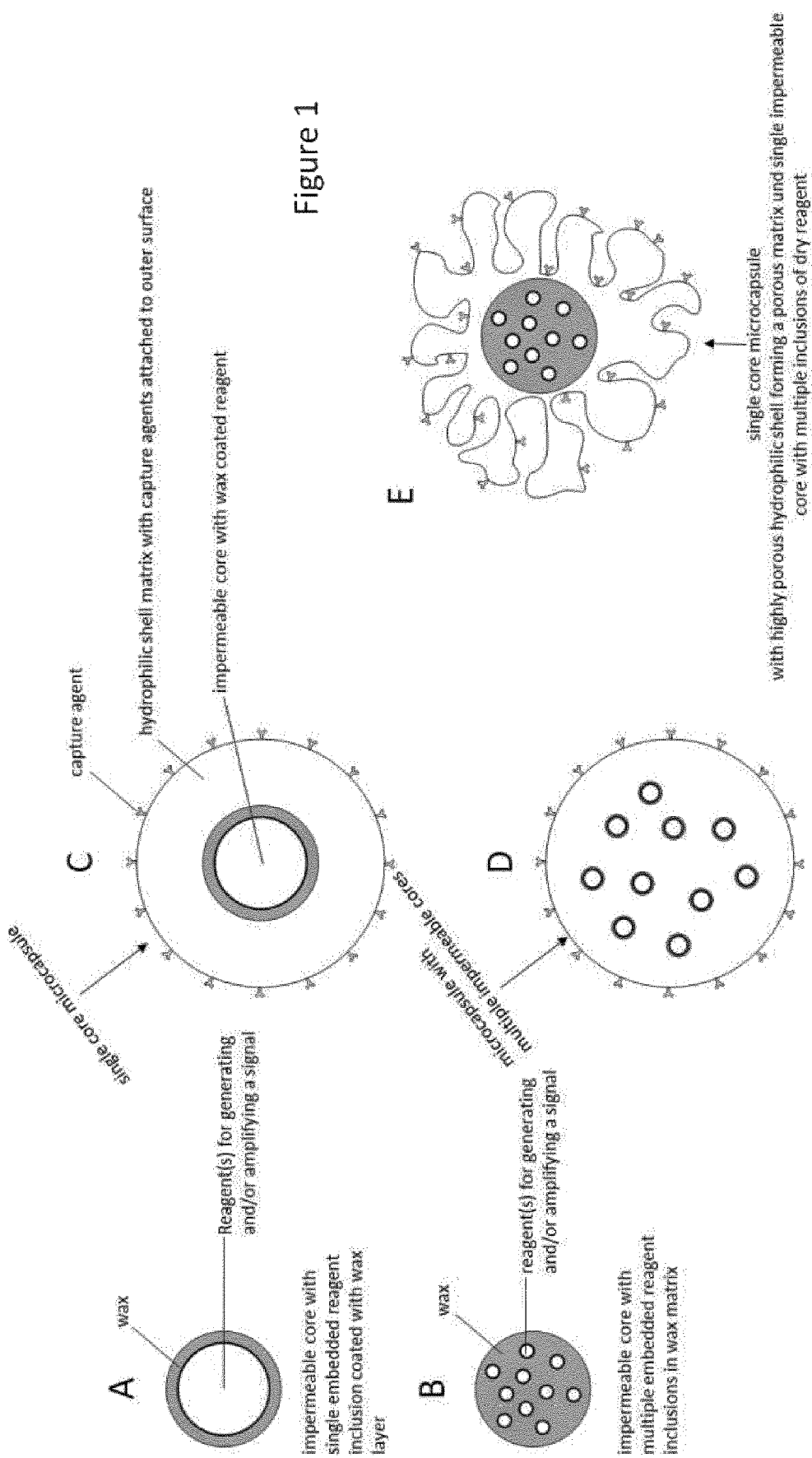

14 Claims, 7 Drawing Sheets
Specification includes a Sequence Listing.

(56) References Cited

FOREIGN PATENT DOCUMENTS

| JP | 58-42971 A | 3/1983 |
|---|---|---|
| JP | 2008-510167 A | 4/2008 |
| JP | 2015-528283 A | 9/2015 |
| JP | 2017-203665 A | 11/2017 |
| WO | 2006/023383 A1 | 3/2006 |
| WO | 2014/028537 A1 | 2/2014 |

OTHER PUBLICATIONS

Gao et al. "Intrinsic peroxidase-like activity of ferromagnetic nanoparticles", Nature Nanotechnology, vol. 2, pp. 577-583, published Sep. 2007 (Year: 2007).*

Thermo Fisher <https://www.thermofisher.com/us/en/home/life-science/protein-biology/protein-assays-analysis/elisa/elisa-microplates-plasticware/adsorption-immunoassay-plates/hydrophilic-protein-binding-plates.html> retrieved on Sep. 20, 2022 (Year: 2022).*

Pillai et al. ("Controlled dissolution from wax-coated aerosol particles in canine lungs", J. Appl. Physiol., vol. 84(2), pp. 717-725, published 1998) (Year: 1998).*

Du et al. ("Magnetically Responsive Phase-Change Microspheres with Large Magnetization Using Ferrite Nanoparticles", Journal of Nanoscience and Nanotechnology, vol. 10, pp. 1733-1736, published 2010 (Year: 2010).*

Tan et al. ("Synthesis of PMMA Microparticles with a Narrow Size Distribution by Photoinitiated RAFT Dispersion Polymerization with a Macromonomer as the Stabilizer", Macromolecules, vol. 47, pp. 6856-6866, published Sep. 19, 2014) (Year: 2014).*

Nagaraj et al. ("Thermostabilization of indigenous multiplex polymerase chain reaction reagents for detection of enterotoxigenic *Staphylococcus aureus*", Journal of Microbiology, Immunology and Infection (2018) vol. 51, pp. 191-198, published online May 13, 2016) (Year: 2016).*

Oster et al. ("Comparative study of DNA encapsulation into PLGA microparticles using modified double emulsion methods and spray drying techniques", Journal of Microencapsulation, May 2005; vol. 22(3): pp. 235-244) (Year: 2005).*

S. Nagaraj et al. ("Development and evaluation of a novel combinatorial selective enrichment and multiplex PCR technique for molecular detection of major virulence-associated genes of enterotoxigenic *Staphylococcus aureus* in food samples" Journal of Applied Microbiology, vol. 116, pp. 435-446, 2013) (Year: 2013).*

Fonte et al. ("Co-encapsulation of lyoprotectants improves the stability of protein-loaded PLGA nanoparticles upon lyophilization" International Journal of Pharmaceutics, vol. 496, (2015), pp. 850-862) (Year: 2015).*

Kaijalainen, S. et al., "An Alternative Hot Start Technique for PCR in Small Volumes Using Beads of Wax-Embedded Reaction Components Dried in Trehalose", Nucleic Acids Research, Jun. 25, 993, vol. 21, No. 12, pp. 2959-2960, Oxford University Press.

Office Action issued by the Japanese Patent Office dated Sep. 28, 2022 in parallel Japanese Application No. 2020-532057 with English translation.

Office Action issued by the Chinese Patent Office dated Feb. 29, 2024 in Chinese Application No. 201880084693.3 with English translation.

* cited by examiner

SEQUENCE LISTING

```
<160> NUMBER OF SEQ ID NOS: 8

<210> SEQ ID NO 1
<211> LENGTH: 9
<212> TYPE: PRT
<213> ORGANISM: Artificial Sequence
<220> FEATURE:
<223> OTHER INFORMATION: Strep-tag

<400> SEQUENCE: 1

Ala Trp Arg His Pro Gln Phe Gly Gly
1               5

<210> SEQ ID NO 2
<211> LENGTH: 9
<212> TYPE: PRT
<213> ORGANISM: Artificial Sequence
<220> FEATURE:
<223> OTHER INFORMATION: Strep-tag II

<400> SEQUENCE: 2

Asn Trp Ser His Pro Gln Phe Glu Lys
1               5

<210> SEQ ID NO 3
<211> LENGTH: 19
<212> TYPE: DNA
<213> ORGANISM: Artificial Sequence
<220> FEATURE:
<223> OTHER INFORMATION: Sense primer

<400> SEQUENCE: 3
gcagtggcgc ccgaacagg                                                   19

<210> SEQ ID NO 4
<211> LENGTH: 22
<212> TYPE: DNA
<213> ORGANISM: Artificial Sequence
<220> FEATURE:
```

-continued

```
<223> OTHER INFORMATION: Antisense primer

<400> SEQUENCE: 4
actgacgctc tcgcacccat ct                                              22

<210> SEQ ID NO 5
<211> LENGTH: 19
<212> TYPE: DNA
<213> ORGANISM: Artificial Sequence
<220> FEATURE:
<223> OTHER INFORMATION: Taq-Man probe labeled with Cy5

<400> SEQUENCE: 5
ctccgacgca acgggctcg                                                  19

<210> SEQ ID NO 6
<211> LENGTH: 200
<212> TYPE: DNA
<213> ORGANISM: Artificial Sequence
<220> FEATURE:
<223> OTHER INFORMATION: Biotin-labeled cDNA template

<400> SEQUENCE: 6
cagtggcgcc cgaacaggga ctttaaagag aaagtgaaac cagggaagaa aacctccgac     60
gcaacgggct cggcttagcg gagtgcacct gctaagaggc gagaggaact cacagagggt   120
gagtaatttt gctggcagtg gccagaccta ggggaagggc gaagtctcta ggggaggaag   180
atgggtgcga gagcgtcagt                                               200

<210> SEQ ID NO 7
<211> LENGTH: 19
<212> TYPE: DNA
<213> ORGANISM: Artificial Sequence
<220> FEATURE:
<223> OTHER INFORMATION: Taq-Man probe labeled with CF647

<400> SEQUENCE: 7
ctccgacgca acgggctcg                                                  19

<210> SEQ ID NO 8
<211> LENGTH: 22
<212> TYPE: DNA
<213> ORGANISM: Artificial Sequence
<220> FEATURE:
<223> OTHER INFORMATION: Biotinylated reverse primer

<400> SEQUENCE: 8
actgacgctc tcgcacccat ct                                              22
```

MICROCAPSULE FOR DETECTING AND/OR QUANTITATING AN ANALYTE IN A SAMPLE

CROSS REFERENCE TO RELATED APPLICATIONS

This application is a National Stage Application of International Application Number PCT/EP2018/085880, filed Dec. 19, 2018; which claims priority to European Application No. 17211031.4, filed Dec. 29, 2017.

The present invention relates to a microcapsule for detecting and/or quantitating an analyte in a sample. Furthermore, the invention relates to a method of detecting and/quantitating an analyte in a sample using said microcapsule. Moreover, the present invention relates to a method of preparing microcapsules for detecting and/or quantitating an analyte in a sample.

Numerous methodologies exist to detect analytes in a sample or to quantify small differences of analyte concentrations. Such technologies have in particular also been employed in multiplex assay formats. For example, a multiplex data acquisition and analysis platform for flow cytometric analysis of microsphere-based assays that performs simultaneous measurement of up to 64 different analytes, is disclosed in Fulton et al., Clinical Chemistry, 1997, 43(9); pp. 1749-1756. In order to detect single analytes in a sample or to quantify small differences of analyte concentrations, digital analysis techniques have been established (Witters et al., Lab. Chip, 2014, 14(17); pp. 3225-3232). In order to provide a defined confinement for a particular biochemical reaction, emulsion techniques have been established and have been used for setting up digital detection schemes (Kanagal-Shamanna, Methods Mol. Biol., 2016, 1392; pp. 33-42). The quality of such assays is considerably dependent on the stability of the emulsion. For this purpose, a combination of certain emulsifiers, provided in a non-aqueous phase and bovine serum albumin (BSA) in the aqueous phase of a water-in-oil-emulsion has been used to form droplets with a protein skin (see US 2011/0217711 A1). This approach has also been used in Hindson et al. (Anal. Chem., 2011, 83(22); pp. 8604-8610). In this approach, PCR-reagents, including BSA are mixed with a diluted aqueous sample, and a microfluidic device is used in order to produce an emulsion of aqueous droplets in a fluorocarbon oil containing suitable emulsifiers. Upon heating to 95° C., a skin forms around the droplet and provides for protection against coalescence during the subsequent thermocycling steps for nucleic acid amplification. The actual skin-forming effect has been known for a long time and has also been utilized to produce microcapsules for drug delivery and as food additives (Acton et al., Journal of Food Science, 1972, 37(5); pp. 795-796 and Gires et al., J. Mech. Behav. Biomed. Mater., 2016, 58, pp. 2-10).

Microcapsules have also been used to perform highly parallel individual polymerase chain reactions (Mak et al., Advanced Functional Materials 2017, 18(19); pp. 2930-2937). Temperature stable microcapsules with a selective permeable capsule wall were constructed by matrix-assisted Layer-by-Layer (LbL) in capsulation technique on agarose gel particles with embedded and dissolved reagents, including a target to be amplified (Bai et al., angewandte Chemie, 2017, 122(30); pp. 5316-5320). In this approach, during the polymerase chain reaction, small molecular weight building blocks, e. g. nucleotides (dNTPs) are supplied externally and diffuse through the permeable capsule wall into the interior such that the resultant high molecular weight PCR products during the PCR, are accumulated within the microcapsule.

All of the aforementioned technologies either require an in-situ-generation of droplets or are difficult to perform requiring the working of an elaborate protocol. Moreover, the resultant capsules do not allow storage or they are difficult to handle and require elaborate protocols to be followed. Accordingly, there is a need in the art for an improved methodology allowing the easy manufacture, storage and use of the microcapsules for detecting and/or quantitating an analyte in a sample. There is also a need in the art to provide for a capsule that is prefabricated and that allows to be used to pre-confection reagents for the detection of an analyte. There is furthermore a need in the art to provide for a capsule that is prefabricated that allows to capture an analyte.

Accordingly, in the first aspect, the present invention relates to a microcapsule for detecting and/or quantitating an analyte in a sample, said microcapsule comprising
  reagents capable of generating and/or amplifying a signal in the presence of an analyte to be detected and/or quantitated; wherein said reagents are in a dry state;
  a porous matrix surrounding said reagents, said porous matrix having means to receive an analyte to be detected and/or quantitated; wherein said dry state reagents are separated from said porous matrix by a barrier, e. g. at least one barrier layer encompassing said reagents.

In one embodiment, said means to receive an analyte to be detected and/or quantitated is an interstitial pore space that is dimensioned to accommodate a liquid sample containing said analyte.

In one embodiment, said interstitial pore space is dimensioned to accommodate sufficient liquid sample to dissolve said dry reagents.

In one embodiment, said means to receive an analyte to be detected and/or quantitated is either said interstitial pore space to accommodate said liquid sample or a combination of said interstitial pore space and one or more capture agents which, upon exposure of said microcapsule(s) to a sample surrounding said microcapsule and containing an analyte to be detected and/or quantitated, are capable of selectively and specifically binding such analyte, wherein said one are more capture agents are attached to a portion of said microcapsule exposed to the surroundings of said microcapsule.

In one embodiment, the microcapsule according to the present invention comprises:
  one or several impermeable cores, preferably water-impermeable cores, containing and/or embedding said reagents capable of generating and/or amplifying a signal, and thus, separating said dry state reagents from said porous matrix;
  a porous hydrophilic shell forming said porous matrix and surrounding said one or several impermeable cores; wherein said one are more capture agents, if present, are attached to said porous hydrophilic shell.

The term "impermeable", as used herein, is preferably meant to refer to an impermeability versus water. In a preferred embodiment a "water-impermeable core" prevents diffusion of water from the surroundings of said core into and/or across said core. An "impermeable core", as used herein, contains and/or embeds reagents capable of generating and/or amplifying a signal which reagents are in a dry state. An "impermeable core", as used herein, therefore effectively separates said dry state reagents from the surroundings and maintains them in a dry state. In embodiments of the invention, the impermeable core therefore represents said at least one barrier layer encompassing said reagents.

In one embodiment, said porous hydrophilic shell is composed of a hydrogel-forming agent or is composed of a thermoresponsive polymer.

In one embodiment,
said hydrogel-forming agent is selected from the group comprising a) synthetic polymers, such as poly(methyl) methacrylate, polyamide; b) silicone-based polymers, e.g. polydimethylsiloxanes; c) naturally occurring polymers selected from polysaccharides, e.g. agarose, chitin, chitosan, dextran, alginate, carrageenan, cellulose, fucoidan, laminaran, gums selected from xanthan gum, arabic gum, ghatti gum, guar gum, locust bean gum, tragacanth gum, karaya gum; and inulin; polypeptides, collagens, gelatins, poly-amino acids, such as poly-lysine; polynucleotides; and combinations thereof; and
said thermoresponsive polymer is an LCST thermoresponsive polymer, preferably selected from poly(N-isopropylacrylamide) (PNIPAm), poly[2-(dimethylamino)ethyl methacrylate] (pDMAEMA), hydroxypropylcellulose, poly(vinylcaprolactame) (P(VCL), and polyvinyl methyl ether, or said thermoresponsive polymer is a thermoresponsive polymer having an upper critical solution temperature (UCST), preferably selected from poly(N-acryloyl glycinamide) (PNAGA), poly(allylamine)-co-poly(allylurea) and its derivatives, poly(methacrylamide), poly(N-acryloylaspargineamide), poly(N-methacryloylglutamineamide), poly(acrylamide)-co-(acrylonitrile). poly(sulfobetaine)s, poly(phosphorylcholine)s.

In one embodiment, said impermeable core is composed of a material suitable for containing and/or embedding said reagents and wherein said material encompasses said reagents and isolates them from other parts of said microcapsule, e.g. said porous matrix, in particular said hydrophilic shell, wherein said material is preferably selected from paraffins, triglycerides, waxes, in particular vegetable waxes, e.g. carnauba wax, animal waxes, e.g. bees wax, petroleum derived waxes, mineral waxes.

In one embodiment, said impermeable core contains and/or embeds said reagents capable of generating and/or amplifying a signal, in a dry state, and separates them from said porous matrix. Because in a preferred embodiment, said impermeable core is a water-impermeable core, such water-impermeable core maintains said reagents in said dry state.

In one embodiment, said reagents capable of generating and/or amplifying a signal are
reagents capable of performing a nucleic acid amplification with a nucleic acid analyte and, wherein, preferably, said reagents include a molecule capable of amplifying said analyte in said sample, such as an amplification enzyme, one or several molecules necessary to facilitate amplifying said analyte, such as one or several nucleic acid primers, nucleotides, salts and buffers, and, optionally one or several detection agents, or
one or several detection agents for detecting a protein or peptide or cell as analyte in said sample, wherein preferably said one or several detection agents are selected from antibodies or antibody fragments, nucleic acids, including aptamers, Spiegelmers, non-antibody proteins, such as receptors, receptor fragments, affinity proteins, e.g. streptavidin, each of them optionally being labelled with a suitable reporter molecule, such as a dye, enzyme, chemical catalyst, or a mixture of reagents capable of starting a chemical reaction that produces an optically or otherwise detectable signal indicating the presence of a protein or peptide or cell as an analyte to be detected.

In one embodiment, said microcapsule does not contain an analyte to be detected.

In one embodiment, said microcapsule is not a capsule or particle that is in-situ generated.

In one embodiment, said capture agent(s) is (are) selected from antibodies, antibody fragments, nucleic acids, including aptamers, spiegelmers, non-antibody proteins capable of specifically binding an analyte or analyte complex, such as receptors, receptor fragments, affinity proteins, e.g. streptavidin, chemical moieties such as Biotin, a Strep-tag®, Digoxigenin, Dinitrophenol, a nucleic acid or nucleic acid analogue-tag or similar chemical moieties capable of being specifically bound, with an affinity in the range of from $K_D=10^{-8}$ to $10^{-15}$ M, by antibodies, antibody fragments, nucleic acids, including aptamers, spiegelmers, non-antibody proteins, such as receptors, receptor fragments, affinity proteins, e.g. streptavidin, or is(are) selected from hydrophobic structures capable of specifically binding hydrophobic molecules or molecules with hydrophobic groups, wherein preferably, said hydrophobic structures have a log D greater than 2 under the conditions in which said detection of said analyte is performed.

The term "Strep-tag®", as used herein, typically refers to a peptide with the sequence -Ala-Trp-Arg-His-Pro-Gln-Phe-Gly-Gly-COOH (Strep-tag®) or . . . -Asn-Trp-Ser-His-Pro-Gln-Phe-Glu-Lys- . . . (Strep-tag® II) which bind reversibly but with high affinity to Streptavidin (Strep-Tag® and Strep-tag® II) or to an engineered form of Streptavidin, i.e. "StrepTactin®", (Strep-tag® II).

The term "log D", as used herein, is meant to refer to the logarithm of the distribution-coefficient (D), which is the ratio of concentrations of a compound in a mixture of two immiscible phases at equilibrium. In a preferred embodiment, the term "distribution coefficient" as used herein, is used synonymously with "partition coefficient". In a preferred embodiment, the "distribution coefficient" refers to the ratio of concentrations of a compound in a mixture of water and 1-octanol. Typically, measurement of such distribution coefficient is done by any suitable methodology known to a person skilled in the art. Such suitable methodologies include the "shake-flask method" in which the compound in question is dissolved in a volume of octanol and water and in which then further the concentration of such compound in each solvent is measured. Other suitable methodologies include high-performance liquid chromatography (HPLC). In such HPLC-methodology, the distribution coefficient (D) and its logarithm can be determined by correlating its retention time with similar compounds with known distribution coefficient values.

In one embodiment, said microcapsule additionally contains one or several protective agents for protecting one or several of the reagents capable of generating and/or amplifying in said aqueous solution, wherein, preferably, said one or several protective agents are selected from cyclodextrins and poly(alkylene oxides).

In one embodiment, said microcapsule additionally contains a label for labelling said microcapsule and/or a magnetic component wherein said magnetic component allows a subsequent manipulation of said microcapsule.

In one embodiment, said reagents capable of performing a nucleic acid amplification additionally include one or several detection agents, wherein said one or several detection agents is/are selected from antibodies or antibody fragments, nucleic acids, including aptamers, Spiegelmers, non-antibody proteins, such as receptors, receptor fragments, affinity proteins, e.g. streptavidin, each of them optionally being labelled with a suitable reporter molecule, such as a dye, enzyme, chemical catalyst, or a mixture of reagents capable of starting a chemical reaction that produces an optically or otherwise detectable signal indicating the presence of an analyte to be detected.

In a further aspect, the present invention relates to a method of detecting and/or quantitating an analyte in a sample, said method comprising:
  i. Providing a microcapsule according to the present invention, as defined in any of the embodiments above;
  ii. exposing said microcapsule to an aqueous sample surrounding said microcapsule and containing or suspected of containing an analyte to be detected and/or quantitated;
  iii. removing said microcapsule from said aqueous sample and transferring said microcapsule to a non-aqueous phase;
  iv. dissolving or disrupting said microcapsule, preferably dissolving or disrupting said impermeable core(s) alone or said impermeable core(s) together with said porous hydrophilic shell, to generate an aqueous droplet in a non-aqueous environment, wherein said aqueous droplet contains said reagents capable of generating and/or amplifying a signal in the presence of an analyte to be detected and/or quantitated, in dissolved form;
  v. Performing a reaction of generating and/or amplifying a signal within said aqueous droplet, wherein a signal is only generated and/or amplified if said analyte has been present in said sample.

In one embodiment, said reaction performed in step v. is a nucleic acid amplification reaction or a signal amplification reaction, wherein preferably said reaction performed in step v. is a nucleic acid amplification reaction selected from PCR, or from isothermal amplification reactions such as TMA, NASBA, LAMP, 3SR, SDA, RCA, LCR, RPA, NEAR.

In one embodiment, in step iv. said microcapsule, preferably said impermeable core(s), is (are) dissolved or disrupted by means selected from mechanical means, chemical cleavage, temperature change, pH change, solvent change, application of an electric field, application of a magnetic field, exposing said microcapsule to electromagnetic radiation, in particular light of a defined wavelength range, such as UV light, preferably a temperature change, more preferably a temperature increase.

In one embodiment, said microcapsule is a microcapsule according to any of the embodiments as defined above, and said porous hydrophilic shell is composed of a LCST (="lower critical solution temperature") thermoresponsive polymer.

In one embodiment, where said porous hydrophilic shell is composed of a LCST thermoresponsive polymer, said method includes, between steps ii. and iii., an additional step
  ii.a heating said microcapsule to a temperature above the lower critical solution temperature (LCST) of said LCST thermoresponsive polymer and subsequently cooling, or allowing to cool, said microcapsule to a temperature below the lower critical solution temperature (LCST) of said LCST thermoresponsive polymer, in order to achieve an enrichment of analyte bound to said microcapsule, and performing such step ii.a n-times, wherein n is an integer from 1 to 1000, preferably 1 to 500, and/or an additional step
  ii.b washing said microcapsule in an aqueous solution to remove unbound analyte, wherein if step ii.b is performed in addition to step ii.a, it is performed either before or after step ii.a.

In another embodiment, said microcapsule is a microcapsule according to any of the embodiments as defined above, and said porous hydrophilic shell is composed of a UCST (="upper critical solution temperature") thermoresponsive polymer.

In one embodiment, where said porous hydrophilic shell is composed of a UCST thermoresponsive polymer, said method includes, between steps ii. and iii., an additional step
  ii.a cooling said microcapsule to a temperature below the upper critical solution temperature (UCST) of said UCST thermoresponsive polymer and subsequently heating, or allowing to heat, said microcapsule to a temperature above the upper critical solution temperature (UCST) of said UCST thermoresponsive polymer again, in order to achieve an enrichment of analyte bound to said microcapsule, and performing such step ii.a n-times, wherein n is an integer from 1 to 1000, preferably 1 to 500, and/or an additional step
  ii.b washing said microcapsule in an aqueous solution to remove unbound analyte,
wherein if step ii.b is performed in addition to step ii.a, it is performed either before or after step ii.a.

In a further aspect, the present invention relates to a method of preparing microcapsules for detecting and/or quantitating an analyte in a sample, said microcapsules being as defined in any of the above embodiments according to the present invention, said method comprising the steps:
  a) providing an aqueous solution of reagents capable of generating and/or amplifying a signal in the presence of an analyte to be detected and/or quantitated, wherein said aqueous solution of reagents, in addition to said reagents, further optionally, comprises one or several protective agents for protecting one or several of the reagents capable of generating and/or amplifying in said aqueous solution;
  b) drying, preferably spray-drying or freeze drying, said aqueous solution of a), thereby generating dried reagents capable of generating and/or amplifying a signal, preferably in nanoparticulate form;
  c) incorporating said dried reagents into a material suitable for containing and/or embedding said reagents, such that said material encompasses said reagents and isolates them, wherein said material is preferably selected from paraffins, triglycerides, waxes, in particular vegetable waxes, e.g. carnauba wax, animal waxes, e.g. bees wax, petroleum derived waxes, mineral waxes;
  d) generating microparticles from the product of c) by drying, preferably spray-drying or freeze drying said product of c), thereby generating impermeable cores;
  e) incorporating said impermeable cores into a porous hydrophilic shell forming a porous matrix and surrounding said one or several impermeable cores by
    incorporating said impermeable cores into a hydrogel-forming agent and inducing said hydrogel-forming agent to form a hydrogel around said impermeable cores, or
   - incorporating said impermeable cores into precursors/monomers of a thermoresponsive polymer and inducing said precursors/monomers to polymerise into a thermoresponsive polymer around said impermeable cores, or incorporating said impermeable cores into a preformed thermoresponsive polymer and allowing said preformed thermoresponsive polymer to form around said impermeable cores;

f) Optionally, coupling one or several capture agents to said porous hydrophilic shell surrounding said one or several impermeable cores, thereby generating microcapsule(s) with one or several capture agents attached, wherein said one or several capture agents, upon exposure of said microcapsule(s) to a sample surrounding said microcapsule and containing an analyte to be detected and/or quantitated, are capable of selectively and specifically binding such analyte;

g) optionally, collecting said microcapsules;

h) further optionally washing and/or drying, preferably freeze-drying, said microcapsules.

In embodiments according to the present invention, there is provided a microcapsule for detecting and/or quantitating an analyte in a sample, wherein the microcapsule comprises reagents capable of generating and/or amplifying a signal in the presence of an analyte to be detected and/or quantitated, wherein said reagents are in a dry state and are separated from a porous matrix surrounding said reagents by an appropriate barrier. The microcapsules according to the present invention are easy and simple to manufacture, they can be stored for extended periods of time, can be shipped and transported at one's convenience and do not need to be prepared in situ at the time and place of their intended use. The barrier used in said microcapsules according to the present invention allows to keep the reagents in a dry state. The barrier can take on many different forms and can for example be at least one barrier layer encompassing said reagents. In another embodiment, said barrier may be one or several impermeable cores which contain and/or embed said reagents and thus isolate them from the porous matrix around said reagents. In yet another embodiment, the reagents capable of generating and/or amplifying a signal may be contained within the microcapsule within one compartment that is separated from the porous matrix surrounding said reagents. In a preferred embodiment, the barrier is formed by the shell(s) of one or several impermeable cores which contain and/or embed said reagents. In such an embodiment, such impermeable core(s) has(have) a shell on the outside which acts as a barrier to protect, separate and isolate the reagents located within such core.

In accordance with embodiments of the present invention, the porous matrix surrounding said reagents have means to receive an analyte to be detected.

In embodiments according to the present invention, the microcapsule itself spans and encompasses a volume, which volume, during use of the microcapsule, serves as a reaction space for the detection and/or quantitation of the analyte. This volume, prior to use of the microcapsule is taken up and filled by the reagents capable of generating and/or amplifying a signal and the impermeable cores containing said reagents, and by the porous matrix surrounding said reagents including the means to receive an analyte.

In one embodiment, said means to receive an analyte is an interstitial pore space of the porous matrix that is dimensioned to accommodate a liquid (i. e. typically aqueous) sample containing said analyte. In one embodiment, the dimensions of said interstitial pore space are chosen such as to accommodate a sufficient amount of liquid (e. g. typically aqueous) sample to dissolve the amount of dry reagents that are located in a microcapsule. In other words, the dimensions of the microcapsule and in particular of the porous matrix are chosen in correspondence with the amount of dry reagents that are contained within said microcapsule. In one embodiment, the porous matrix having means to receive an analyte to be detected and/or quantitated acts, by means of said interstitial pore space, as a sponge to take up a liquid sample which may include an analyte. By taking up such liquid sample, the analyte is, effectively, received by said microcapsule. In one embodiment, the means to receive an analyte to be detected is, in addition to said interstitial pore space, additionally formed by the presence of one or more capture agents which are attached to a portion of said microcapsule exposed to the surroundings thereof. In those embodiments, where the microcapsule comprises a porous hydrophilic shell forming said porous matrix, said one or more capture agents are attached to said porous hydrophilic shell, because this porous hydrophilic shell is exposed to the surroundings of said microcapsule and comes into contact with any sample to which that microcapsule might be exposed.

In one embodiment, the microcapsule in accordance with the present invention has a size in the range of from 1 µm to 2000 µm, preferably 1 µm to 1500 µm, more preferably 10 µm to 1000 µm, even more preferably 20 µm to 500 µm, even more preferably 30 µm to 300 µm and any ranges therebetween.

The term "has a size", as used herein in the context of a microcapsule in accordance with the present invention, typically refers to the dimensions of such microcapsule and typically refers to the longest dimension of such microcapsule. In one embodiment, the term "size" refers to the average diameter of a microcapsule.

In one embodiment, said microcapsule has the shape of a sphere, an ellipsoid, a ball, an egg, or an irregular round-shaped body.

The term "micro", as used herein typically refers to dimensions in the micrometer range.

In one embodiment, a "microcapsule" is effectively an encapsulated microsphere which has, in its inside, reagents capable of generating and/or amplifying a signal in the presence of an analyte to be detected and/or quantitated; wherein said reagents are in the dry state; and furthermore comprises a porous matrix surrounding said reagents, said porous matrix having means to receive an analyte to be detected and/or quantitated; wherein said dry state reagents are separated from said porous matrix by a barrier, e.g. at least one barrier layer encompassing said reagents. In one embodiment, such encapsulated microsphere comprises one or several impermeable cores containing and/or embedding said reagents capable of generating and/or amplifying a signal, and thus, separating said dry state reagents from said porous matrix; and furthermore comprises a porous hydrophilic shell forming said porous matrix and surrounding said one or several impermeable cores; wherein said one or more capture agents, if present, are attached to said porous matrix, or, in one embodiment, to said porous hydrophilic shell.

In accordance with embodiments of the present invention, a microcapsule according to the present invention may also be characterized by the volume which it encompasses. Such volume encompassed by said microcapsule effectively represents the reaction space in which detection and/or quantitation of an analyte takes place. In one embodiment, the volume encompassed by said microcapsule represents the maximum reaction space available for detection and/or quantitation of an analyte. Hence, the microcapsule, by way of the encompassed volume, provides for a reaction space available for detection and/or quantitation of an analyte which reaction space is filled partially or entirely with water or an aqueous solution during detection and/or quantitation of an analyte. Typically the water or aqueous solution with which said reaction space is filled during detection and/or quantitation stems from the sample suspected of containing an analyte, or it stems from a wash solution or buffer to which said microcapsule is exposed after the analyte has been bound (i.e. after said microcapsule has previously been exposed to a sample suspected of containing an analyte).

In one embodiment, a microcapsule has a volume in the range of from 0.5 fl to 4.2 µl, preferably 0.5 fl to 1.8 nl, more preferably 500 fl to 525 nl, even more preferably 4 pl to 65 nl, even more preferably 14 pl to 14 nl, and any ranges therebetween.

In embodiments, where the microcapsule comprises a porous hydrophilic shell which forms said porous matrix, said porous hydrophilic shell is not a shell formed by polyelectrolytes. More specifically, it is not a shell formed by polyelectrolytes that have been deposited by a layer-by-layer-deposition technique.

Because the reagents capable of generating and/or amplifying a signal, before use of the microcapsule, are present in the microcapsule, in a dry state, the microcapsule according to the present invention can be produced in an easy manner and, importantly, separate, both in time and space from the time and space when the microcapsule is intended to be used. Hence, microcapsules in accordance with the present invention can also be stored easily for prolonged periods of time and can be shipped without requiring extensive efforts on temperature maintenance or other storage conditions.

During use, a microcapsule in accordance with embodiments of the present invention may be exposed to an aqueous liquid sample which contains an analyte which aqueous liquid sample will then be taken up by the porous matrix of said microcapsule. Effectively, if said sample contains an analyte, thereby said porous matrix receives an analyte to be detected. The means to receive an analyte to be detected and/or quantitated may additionally be, in addition to said interstitial pore space, also one or more capture agents which are attached to a portion of said microcapsule exposed to the surroundings of said microcapsule. Such one or more capture agents, upon exposure of said microcapsule(s) to a sample surrounding said microcapsule and containing an analyte or suspected of containing an analyte to be detected and/or quantitated, are capable of selectively and specifically binding such analyte. Hence, by the presence of these capture agents, the capability of the microcapsule to receive and to selectively bind an analyte to be detected and/or quantified is greatly enhanced. In embodiments of the present invention, the interstitial pore space of said porous matrix facilitates the immobilization and uptake of liquid sample to the microcapsule. By the presence of the interstitial pore space, the porous matrix of said microcapsule acts as a reservoir for liquid uptake including or suspected of including an analyte to be detected and/or quantitated.

During use, after having been exposed to a sample suspected of containing an analyte, a microcapsule in accordance with embodiments of the present invention may additionally be exposed to an aqueous liquid, such as a washing buffer or another preferred aqueous medium, such as an exchange buffer with defined concentrations and conditions, such as salt concentrations, buffer concentrations, pH etc. The aqueous liquid will then typically be taken up by the porous matrix of said microcapsule and fill the volume of said microcapsule partially or entirely and/or, possibly, replace liquid that is present there from previous reactions or exposures. The volume of said microcapsule effectively then represents the reaction space in which detection and/or quantitation of an analyte takes place.

During use, once the microcapsule has taken up liquid sample and, optionally, has undergone one or several washing steps or buffer exchange steps, the microcapsule in accordance with the present invention is removed from said aqueous sample or from the aqueous phase of said aqueous sample and is transferred to a non-aqueous phase. Once the microcapsule(s) has (have) been transferred to a non-aqueous phase, the impermeable core(s), alone, or the impermeable core(s) and the porous hydrophilic shell forming said porous matrix and surrounding said one or several impermeable cores, is/are dissolved or disrupted. As a result thereof, an aqueous droplet in a non-aqueous environment is generated for each dissolved/disrupted microcapsule. Such aqueous droplet has a volume that corresponds to the volume of aqueous liquid that has previously been taken up by said microcapsule. In one embodiment, the volume of said aqueous droplet corresponds substantially to the volume of the microcapsule. In another embodiment the microcapsule has previously not taken up aqueous liquid to its full capacity, i.e. to its full volume. In this case, the volume of said aqueous droplet corresponds to a fraction of the volume of said microcapsule. The dissolving/disrupting occurs by any suitable means, selected from mechanical means, chemical cleavage, temperature change, in particular an increase in temperature allowing the melting of the impermeable core(s) and of the porous hydrophilic shell(s). Other suitable means include a pH change, a solvent change, the application of an electric field and/or a magnetic field, the exposure of said microcapsule to electromagnetic radiation, in particular light of a defined wave lengths, such as UV-light. The aqueous droplet that is generated by such dissolving/disrupting has the same volume or essentially the same volume that is spanned/encompassed by the microcapsule. The aqueous droplet contains all the reagents capable of generating and/or amplifying a signal, and, if the liquid sample to which the microcapsule had previously been exposed, also had contained an analyte, the aqueous droplet also contains such analyte. The aqueous droplet thus provides a reaction space allowing for the detection and/or quantitation of an analyte in a sample. In such reaction space, typically a signal is generated and/or amplified within said aqueous droplet, wherein such signal is only generated and/or amplified if said analyte has been present in said sample to which the microcapsule had previously been exposed. In one embodiment, the reaction of generating and/or amplifying a signal is a nucleic acid amplification reaction or is a signal amplification reaction. In one embodiment, the analyte is amplified by way of an amplification reaction, and the thus amplified product is detected by means of a detection agent, this being particularly preferred in the case that the analyte is a nucleic acid and the amplification reaction is a nucleic acid amplification reaction. Examples of such nucleic acid amplification reactions are polymerase chain reaction (PCR), or isothermal amplification reactions, such as transcription-mediated amplification (TMA), nucleic acid sequence-based amplification (NASBA), loop-mediated isothermal amplification (LAMP), self-sustained sequence replication (3SR), strand displacement amplification (SDA), rolling circle amplification (RCA), ligase chain reaction (LCR), recombinase polymerase amplification (RPA), and nicking enzyme amplification reaction (NEAR). A person skilled in the art is well aware of any of these amplification reactions and is capable of performing these, as necessary. In a further embodiment, detection of the analyte may occur by performing first a signal amplification reaction and subsequently detecting the thus amplified signal. In the latter embodiment, a signal is only amplified if there is a signal in the first place, that is, a signal only occurs when there is an analyte to be detected, and the signal amplification reaction may for example be a nucleic acid amplification if a nucleic acid is or forms part of the detection agent. Alternatively, the signal amplification reaction may be an enzyme-based amplification of a signal, if an enzyme is or forms part of the detection agent.

In accordance with embodiments of the present invention, there is also provided a method of preparing microcapsules for detecting and/or quantitating an analyte in a sample, such microcapsules being as defined in any of the embodiments above. In this method, in accordance with step a), an aqueous solution of reagents is provided, wherein said reagents are capable of generating and/or amplifying a signal in the presence of an analyte to be detected and/or quantitated, wherein said aqueous solution of reagents, in addition to said reagents, further optionally, comprises one or several protective agents for protecting one or several of the reagents capable of generating and/or amplifying, in said aqueous solution. According to this method of preparing, in a further step, namely step b), the aqueous solution of step a) is dried, preferably spray-dried or freeze-dried whereby dried reagents capable of generating and/or amplifying a signal are generated. Preferably, such drying results in the reagents being in a nanoparticulate form. In a further step, namely step c), said dried reagents resulting from step b) are incorporated into a material suitable for containing and/or embedding said reagents, such that said material encompasses said reagents and isolates them. In a preferred embodiment, the material encompassing said reagents is selected from paraffins, triglycerides, waxes, in particular vegetable waxes, e. g. carnauba wax, animal waxes, e. g. bees wax, petroleum derived waxes, and mineral waxes. The purpose of such paraffins, triglycerides and/or waxes is to provide a barrier by which the reagents capable of generating and/or amplifying a signal are separated from said porous matrix of the microcapsule. In one embodiment, such paraffins, triglycerides and/or waxes have a congealing point in the range of from 50° C. to 80° C. In one embodiment the congealing point is measured in accordance with ASTM D938. As outlined above, the reagents are in a dry/dried state and should be kept in such state for as long as possible, namely until the barrier is deliberately dissolved. As also outlined further above, the porous matrix preferably encompasses an interstitial pore space for accommodating a liquid sample with which, however, the reagents capable of generating and/or amplifying a signal should not come into contact with prematurely. The waxes/triglycerides/paraffins mentioned above are suitable barrier materials for such purpose.

Once the dried reagents from step b) have been incorporated into said material in step c), there follows a further step d) in which microparticles are generated from the product of c) by drying, preferably by spray-drying or freeze-drying said product of step c), thereby generating impermeable cores which contain and/or embed said reagents capable of generating and/or amplifying a signal. The impermeable cores generated in step d) are subsequently incorporated into a porous hydrophilic shell in a further step, namely step e). Said porous hydrophilic shell forms a porous matrix and surrounds said one or several impermeable cores. The incorporation of said impermeable cores into said porous hydrophilic shell is achieved by either incorporating said impermeable cores into a hydrogel-forming agent and by inducing said hydrogel-forming agent to form a hydrogel around said impermeable cores, or incorporating said impermeable cores into precursors/monomers of a thermoresponsive polymer and inducing said precursors/monomers to polymerize into a thermoresponsive polymer around said impermeable cores, or incorporating said impermeable cores into a preformed thermoresponsive polymer and allowing said preformed thermoresponsive polymer to form around said impermeable cores.

It should be noted that, in the aforementioned embodiments involving a thermoresponsive polymer, said thermoresponsive polymer forms said porous hydrophilic shell into which said impermeable cores are incorporated.

In one embodiment, the method of preparing microcapsules in accordance with the present invention optionally contains the further step f) coupling one or several capture agents to said porous hydrophilic shell surrounding said one or several impermeable cores, whereby microcapsule(s) with one or several capture agents attached are generated, wherein said one or several capture agents, upon exposure of said microcapsule(s) to a sample surrounding said microcapsule and containing an analyte to be detected and/or quantitated, are capable of selectively and specifically binding such analyte.

In one embodiment, the method of preparing microcapsules in accordance with the present invention optionally contains the further step g) wherein said microcapsules are collected. In one embodiment, the method of preparing microcapsules in accordance with the present invention additionally contains the further optional step h) of washing and/or drying, preferably freeze-drying, said microcapsules.

In embodiments of a microcapsule according to the present invention, the microcapsule contains only a single impermeable core surrounded by a porous hydrophilic shell. In another embodiment, the microcapsule according to the present invention contains a plurality of impermeable cores, such plurality of cores being surrounded by said porous hydrophilic shell.

In one embodiment, said porous hydrophilic shell is composed of a hydrogel-forming agent or is composed of a thermoresponsive polymer. In one embodiment, the hydrogel-forming agent is selected from the group comprising a) synthetic polymers, such as poly(methyl)methacrylate, polyamide; b) silicone-based polymers, e. g. polydimethyl siloxanes; c) naturally occurring polymers selected form polysaccharides, e. g. agarose, chitin, chitosan, dextran, alginate, carrageenan, cellulose, fucoidan, laminaran, gums selected from xanthan gum, arabic gum, ghatti gum, guar gum, locust bean gum, tragacanth gum, karaya gum and inulin; polypeptides, collagens, gelatins, poly-amino acids, such as polylysine; polynucleotides and combinations thereof. Hydrogel forming agents are known to a person skilled in the art and are, for example, described in Cal& European Polymer Journal, 2015, 65, pp. 252-267.

In one embodiment, the porous hydrophilic shell is composed of a thermoresponsive polymer which may, or may not, form a hydrogel. Thermoresponsive polymers are polymers that exhibit a discontinuous change of one or several of their physical properties in dependence on the temperature. A typical example of the physical property that is changed, is the solubility, for example in water. An exemplary typical thermoresponsive polymer is soluble and transparent in water at low temperature and undergoes a reversible phase transition, with respect to its solubility in water, with rising temperature which results in a cloud or forms a precipitate in aqueous solution at high temperature. The intrinsic temperature at which such phase transition occurs is called a lower critical solution temperature (LCST). Another exemplary typical thermoresponsive polymer is soluble and transparent in water at high temperature and undergoes a reversible phase transition, with respect to its solubility in water, with lowering temperature which results in a cloud or forms a precipitate in aqueous solution at low temperature. The intrinsic temperature at which such phase transition occurs is called a upper critical solution temperature (UCST).

In one embodiment of the microcapsules according to the present invention, the porous hydrophilic shell is composed of a thermoresponsive polymer, wherein, preferably, said thermoresponsive polymer is an LCST (=lower critical solution temperature) thermoresponsive polymer. In one embodiment, such LCST thermoresponsive polymer is selected from poly(N-isopropylacrylamide) (PNIPAm), poly[2-(dimethylamino)ethyl methacrylate] (pDMAEMA), hydroxypropylcellulose, poly(vinylcaprolactame) (P(VCL), and polyvinyl methyl ether.

In another embodiment of the microcapsules according to the present invention, the porous hydrophilic shell is composed of a thermoresponsive polymer, wherein, preferably, said thermoresponsive polymer is an UCST (=upper critical solution temperature) thermoresponsive polymer. In one embodiment, such UCST thermoresponsive polymer is selected from poly(N-acryloyl glycinamide) (PNAGA), poly(allylamine)-co-poly(allylurea) and its derivatives, poly (methacrylamide), poly(N-acryloylaspargineamide), poly(N-methacryloylglutamineamide), poly(acrylamide)-co-(acrylonitrile). poly(sulfobetaine)s, poly(phosphorylcholine)s Embodiments of the microcapsules according to the present invention wherein the porous hydrophilic shell is composed of a thermoresponsive polymer, in particular an LCST thermoresponsive polymer are particularly suited for enriching an analyte with the microcapsule. This is, because with such embodiment, it is possible to heat the microcapsule to a temperature above the lower critical solution temperature (LCST) of the LCST thermoresponsive polymer, as a result of which its solubility in water will rapidly decrease and as a result of which the entire microcapsule will contract/condense and thereby change the overall volume spanned or encompassed by said microcapsule. By such contraction, solvent, in particular water, will get expelled from the microcapsule, in particular the porous hydrophilic shell. Thereafter, the microcapsule is subsequently cooled or allowed to cool to a temperature below the lower critical solution temperature (LCST) of said LCST thermoresponsive polymer, again, as a result of which the thermoresponsive polymer will increase in solubility again, and thereby the porous hydrophilic shell will get expanded again thus allowing the pores of said porous hydrophilic shell to be filled with solution containing analyte. By this process of heating and cooling above and below the lower critical solution temperature, an enrichment of the analyte in said porous hydrophilic shell is achieved. This step of heating and cooling is reversible and may optionally be repeated one or several times, e.g. up to 1000 times or even more, preferably up to 500 times, and this will result in an enrichment of the analyte. In some embodiments, the step of heating and cooling may be repeated several thousand times, e.g. up to 10000 or any number of times between 1000 and 10000. The effect will even be increased, if one or more capture agents are attached to said porous hydrophilic shell, in which case, upon expansion of the porous hydrophilic shell, the analyte may get bound to said capture agents.

Other embodiments of the microcapsules according to the present invention wherein the porous hydrophilic shell is composed of a thermoresponsive polymer, in particular an UCST thermoresponsive polymer are particularly suited for enriching an analyte with the microcapsule. This is, because with such embodiment, it is possible to cool the microcapsule to a temperature below the upper critical solution temperature (UCST) of the UCST thermoresponsive polymer, as a result of which its solubility in water will rapidly decrease and as a result of which the entire microcapsule will contract/condense and thereby change the overall volume spanned or encompassed by said microcapsule. By such contraction, solvent, in particular water, will get expelled from the microcapsule, in particular the porous hydrophilic shell. Thereafter, the microcapsule is subsequently heated or allowed to heat to a temperature above the upper critical solution temperature (UCST) of said UCST thermoresponsive polymer, again, as a result of which the thermoresponsive polymer will increase in solubility again, and thereby the porous hydrophilic shell will get expanded again thus allowing the pores of said porous hydrophilic shell to be filled with solution containing analyte. By this process of cooling and heating below and above the upper critical solution temperature, an enrichment of the analyte in said porous hydrophilic shell is achieved. Optionally, this step of cooling and heating may be repeated one or several times, e.g. up to 1000 times or even more, preferably up to 500 times, and this will result in an enrichment of the analyte. The effect will even be increased, if one or more capture agents are attached to said porous hydrophilic shell, in which case, upon expansion of the porous hydrophilic shell, the analyte may get bound to said capture agents.

Furthermore, reference is made to the figures wherein:

FIG. 1 shows a schematic representation of various embodiments of microcapsules in accordance with the present invention. Panel A shows an embodiment of an impermeable core with a single embedded reagent inclusion. The reagent(s) is(are) in a dry state and is(are) maintained as such. The impermeable core is coated with a triglyceride layer separating the dry reagent(s) from the surroundings, e.g. a wax layer; panel B shows an embodiment of an impermeable core with multiple reagent inclusions embedded in a triglyceride matrix, e.g. a wax matrix; panel C shows an embodiment of a microcapsule having a single impermeable core in which reagents capable of generating and/or amplifying a signal are contained. The microcapsule additionally comprises a hydrophilic shell matrix surrounding said impermeable core, and furthermore has capture agents attached to said hydrophilic shell. Panel D shows an embodiment of a microcapsule having multiple impermeable cores with reagents inside and surrounded by a hydrophilic shell matrix. Again capture agents are attached to said hydrophilic shell. Panel E shows an embodiment of a microcapsule including a single impermeable core with reagents inside and having a highly porous hydrophilic shell forming a porous matrix surrounding said single impermeable core with reagents. Capture agents are attached to said porous hydrophilic shell.

Figure 2:
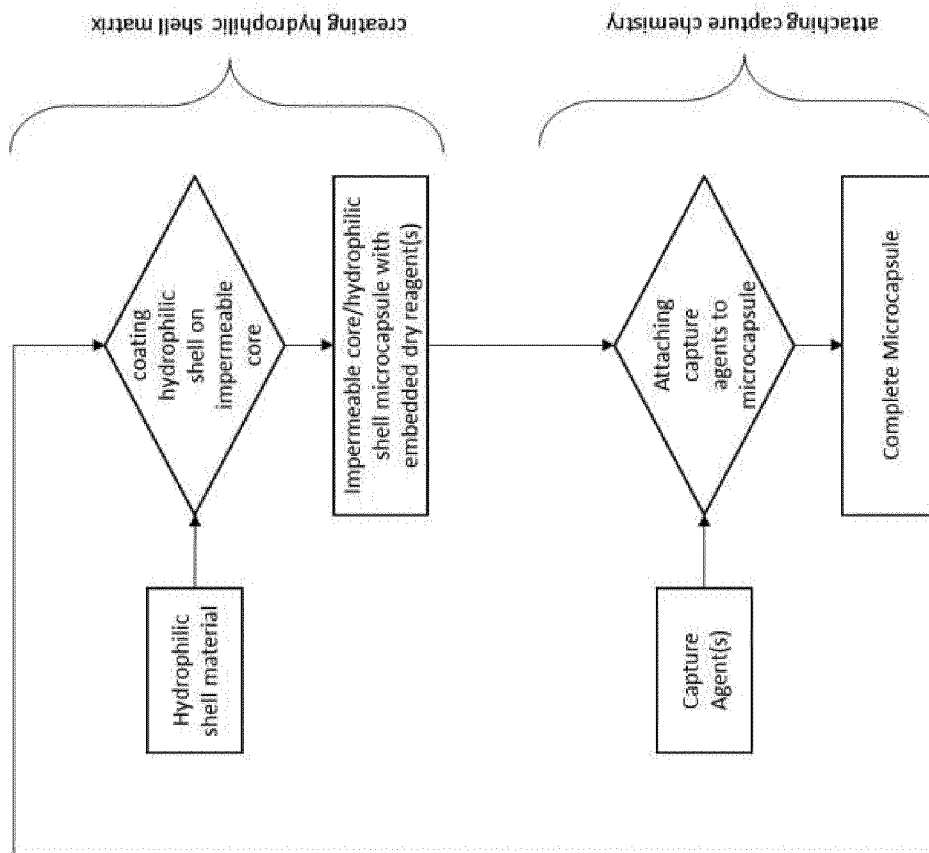
Figure 2:
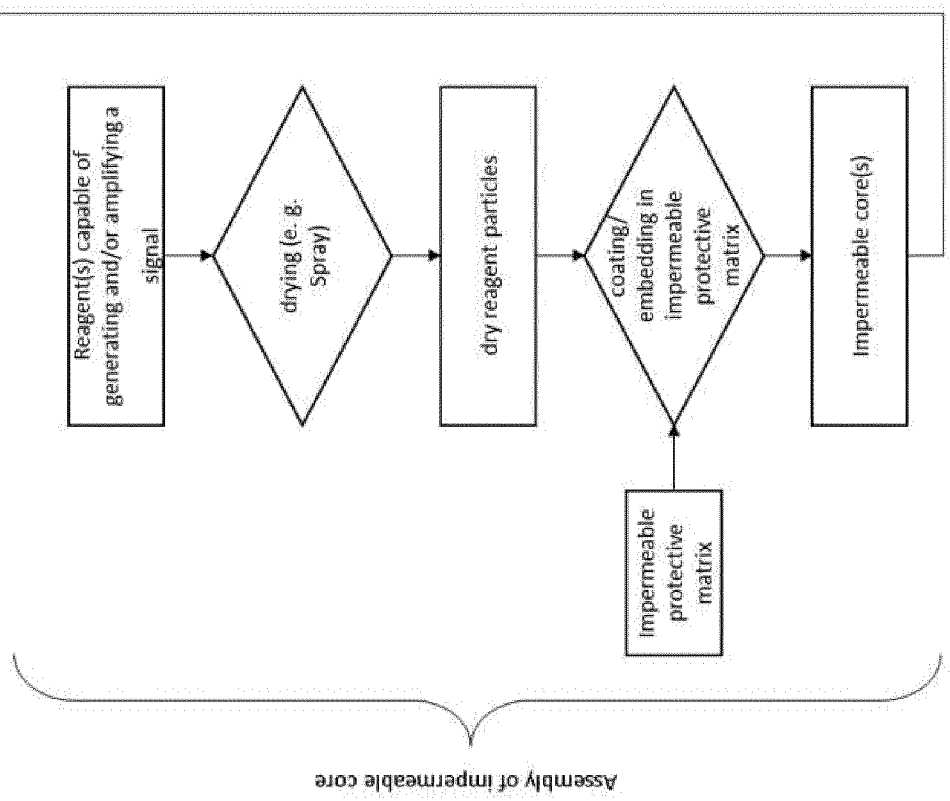

FIG. 2 shows a schematic flow chart of the manufacture of embodiments of microcapsules in accordance with the present invention.

Figure 3:
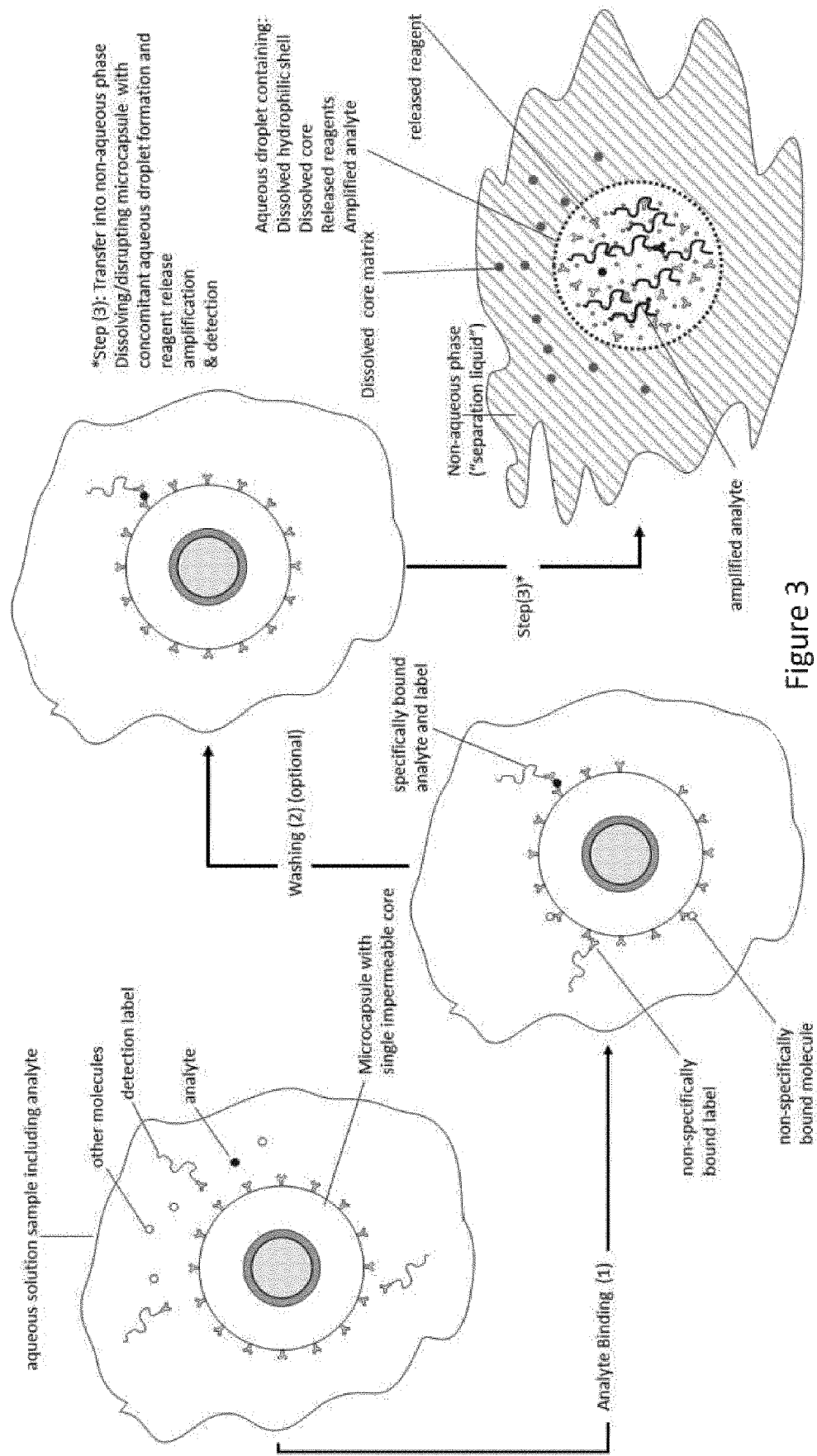

FIG. 3 shows a schematic representation of the use of an embodiment of a microcapsule according to the present invention. More specifically, in step 1, a microcapsule having a single impermeable core with dry reagents inside and having capture agents for said analyte, is exposed to an aqueous solution sample suspected of containing an analyte (and, in fact, containing such analyte). Also contained in the aqueous solution sample is a detection label which itself is also capable of binding said analyte. Upon exposure to said sample, analyte is bound by the capture agents and is labelled by the detection label. Any non-specifically bound detection label is subsequently washed of in a washing step (step 2) which step, however, is optional. In step 3, the microcapsule is transferred (in)to a non-aqueous phase and is dissolved/disrupted, e.g. by a suitable temperature change or pH change, with concomitant aqueous droplet formation and reagent release, followed by amplification and/or detection. The microcapsule provides for the reaction space in which such amplification and/or detection takes place.

Figure 4:
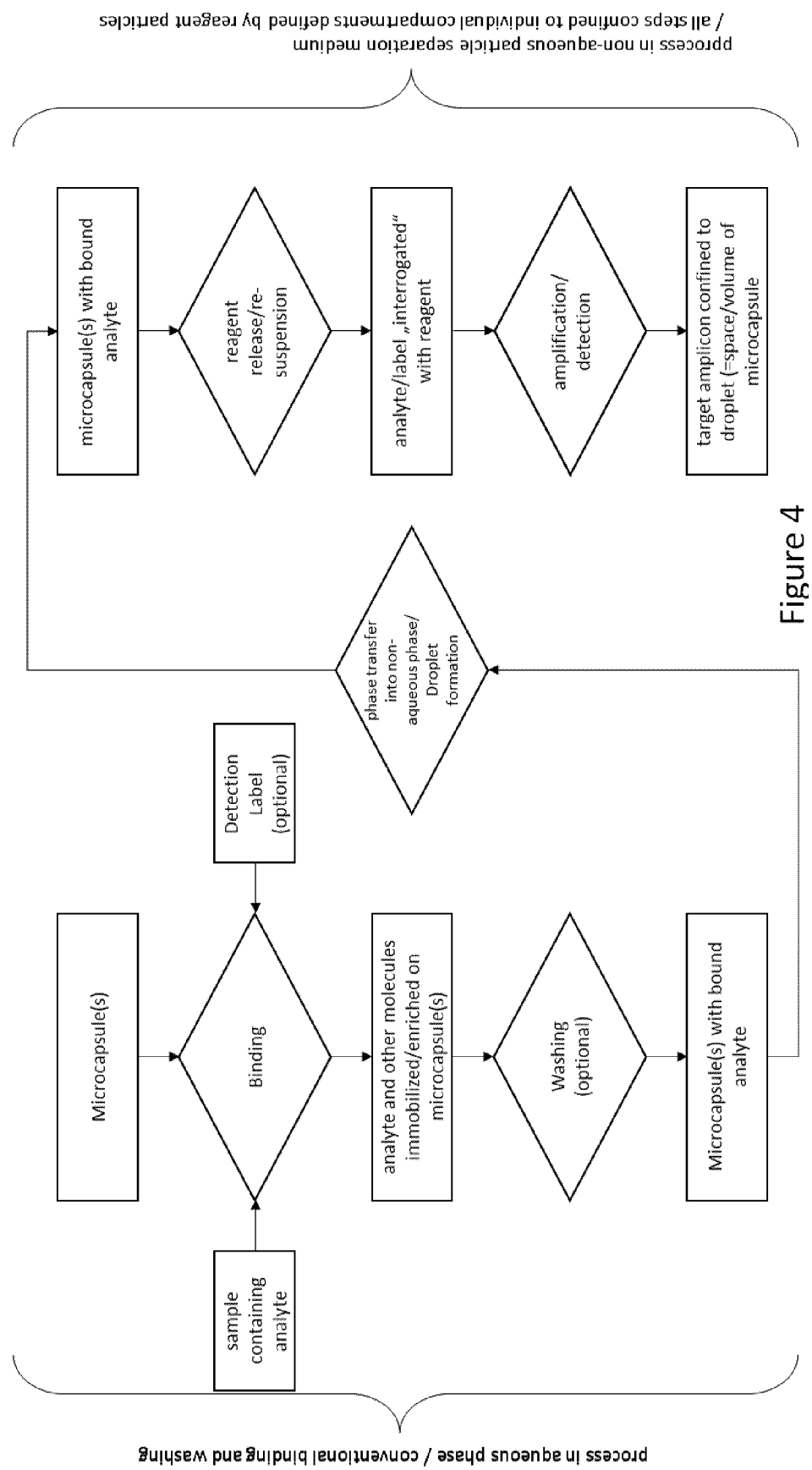

FIG. 4 shows a schematic flow chart of the use of embodiments of microcapsules in accordance with the present invention.

Figure 5:
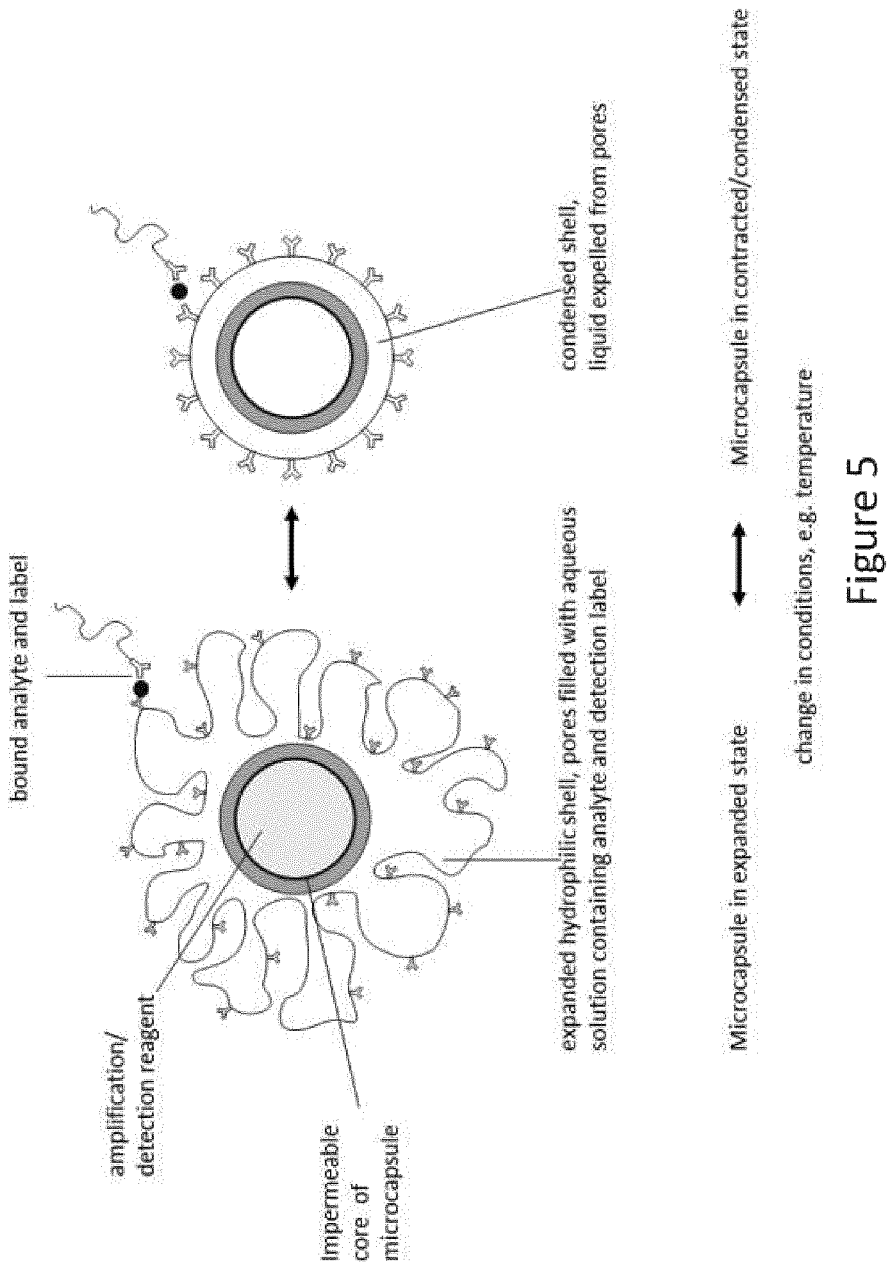

FIG. 5 shows an embodiment of a microcapsule comprising a single impermeable core with reagents embedded therein and further comprising a porous hydrophilic shell composed of a material capable of undergoing a phase change in response to change of an external parameter, e.g. a thermoresponsive polymer. In the expanded state of the porous hydrophilic shell, the pores are filled with aqueous solution containing analyte and a detection label. Upon changes in the surrounding conditions, e.g. temperature, the shell becomes condensed, and the liquid is expelled from the pores whilst any bound analyte remains with the microcapsule. The process is reversible, and thus the microcapsule can be cycled between an expanded state and a condensed state.

Figure 6:
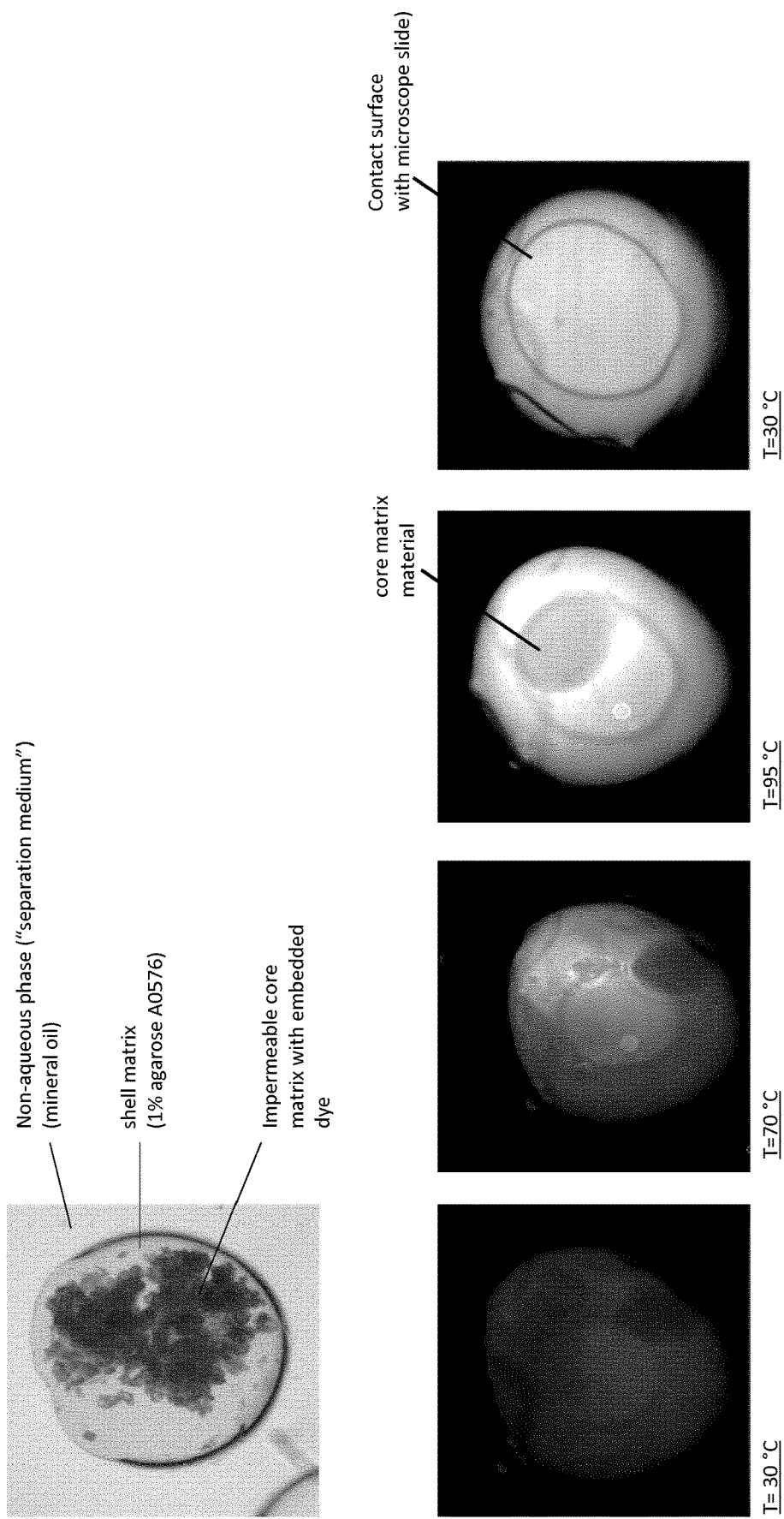

FIG. 6 shows photographic images of an embodiment of a microcapsule having a porous hydrophilic shell surrounding an impermeable core with a fluorescent dye embedded (top left photograph showing a light transmission image of single reagent particle). The microcapsule contains a fully formed porous hydrophilic shell which contains water, and the microcapsule is surrounded by a non-aqueous phase.

microcapsule with diameter of app. 500 μm on microscope slide in mineral oil

Shell consisting of 1% Agarose (type A0576)

multiple core particles representing 7% of particle weight core particles generated by spray drying 10% (wt) Rhodamin/Cavasol powder Tm wax=58° C.

Tm agarose=75° C.

The lower series of photographs shows four stages of a heating process of said microcapsule from 30° C. to 70° C. to 95° C. and back down to 30° C.

T=30° C.: Low fluorescence, dry dye surrounded by hydrophobic core matrix

T=70° C.: Core matrix melting, fluorescent dye released; fluorescence signal increases upon solution of fluorescent dye in aqueous buffer solution contained in agarose gel shell T=95° C.: Agarose matrix molten, dye fully re-suspended; core matrix material fused into single large droplet T=30° C.: Particle with distributed fluorescent dye in agarose gel matrix; core material released into surrounding oil At 30° C. the dry dye contained in the impermeable core shows a low fluorescence. Upon heating to 70° C. the matrix of the impermeable core melts, and the fluorescent dye is released. The fluorescence signal increases when the dye gets dissolved in the solution contained in the porous hydrophilic shell. Upon further heating to 95° C., also the hydrophilic shell material, e.g. agarose melts, and the fluorescent dye is fully dissolved. The core material is fused into a single large droplet. Upon cooling of the particle down to 30° C. again, the fluorescent dye has become distributed throughout the porous hydrophilic shell matrix whereas the core material from the impermeable core has been released into the surrounding nonaqueous phase.

Figure 7:
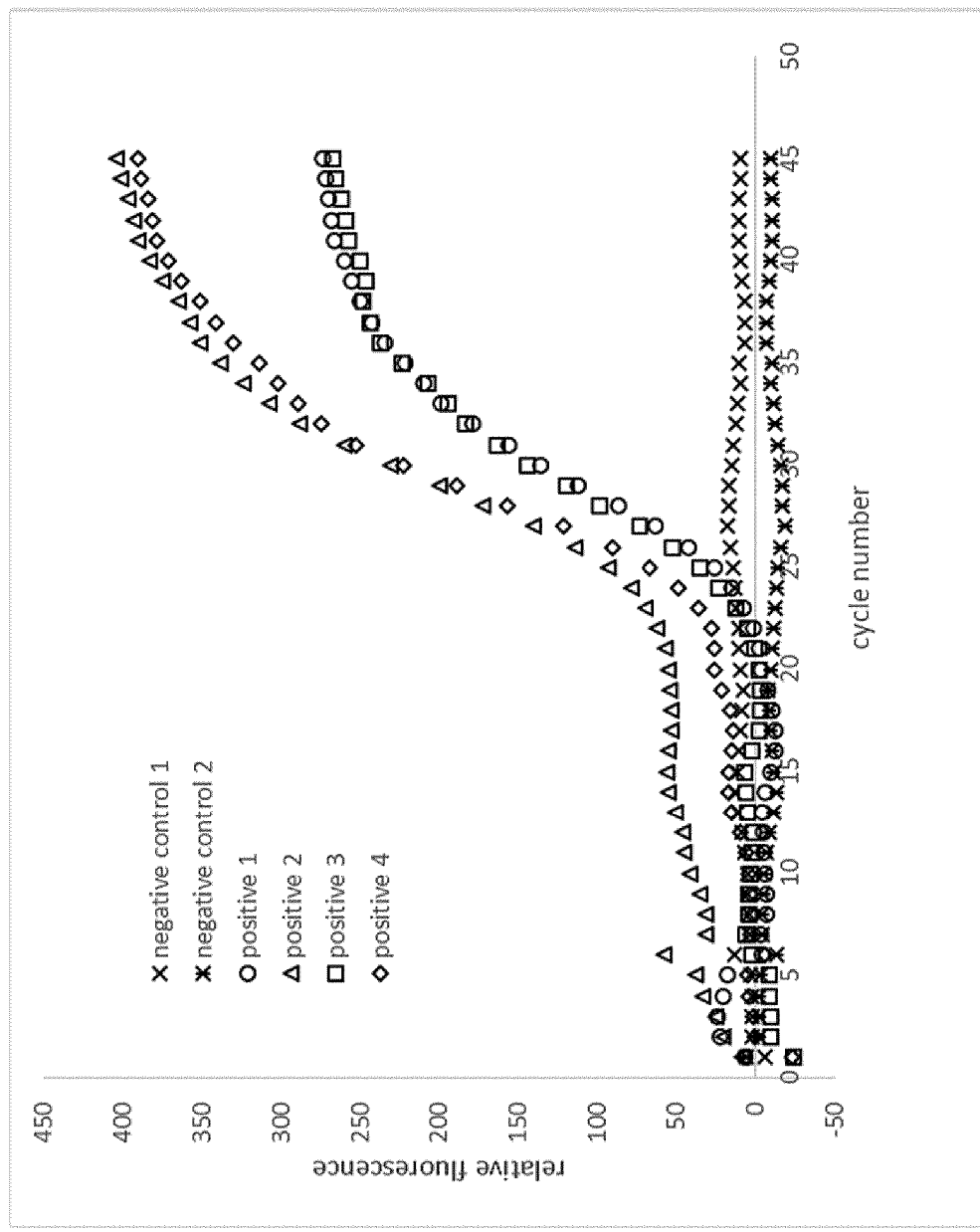

FIG. 7 shows an example of an embodiment of a microcapsule according to the present invention in which pelleted and lyophilised PCR-reagents were incorporated into paraffin wax, and the thus produced wax coated particles ("impermeable cores") were transferred to a liquid volume of an agarose solution to generate a porous hydrophilic shell around the impermeable cores. The thus produced microcapsules were dried and subsequently incubated with or without analyte in aqueous solution. Thereafter the microcapsules were transferred to a non-aqueous phase, and PCR was performed. In the setups designated as "positive 1", "positive 2", "positive 3", "positive 4", an increase in fluorescence can be observed showing that amplification/detection takes place. In the setups designated as "negative control 1" and "negative control 2", no increase in fluorescence can be observed, thus indicating that no amplification takes place. More specifically, the amplification/detection comprised the following:

pelleted lyophilized PCR-reagent was coated with paraffin wax (Tm 58° C.) in order to provide a water impermeable layer wax coated particles transferred to liquid volume of 1% agarose solution necessary to re-suspend the coated reagent at an appropriate final reagent concentration; agarose has been kept above gelling point (agarose type A2576, Tg≤20° C., Tm=62° C.)

dried agarose particles incubated have been incubated with aqueous solution containing no analyte (samples negative control 1 and 2) and with analyte (samples positive 1,2,3,4)

aqueous solution has been replaced with paraffin oil

PCR cycling and real time detection for individual containers was performed in accordance with standard procedures Furthermore, reference is made to the following examples which are given to illustrate, not to limit the present invention.

EXAMPLES

Embodiment 1. Fabrication of Monodisperse Reagent Containing Microcapsules

Preparation of Microcapsule Solutions

Ultra-low gelling temperature agarose A2576 (Sigma) with a gel point 20° C. and a melting point of ≤62° C. is labeled with reactive biotin monochlorotriazinyl dye (INNOVENT). Alternatively, the agarose can first be activated and then coupled to EZ-Link™ Amine-PEG$_{11}$ biotin. Furthermore, the activation can be carried out by bromine cyan modification, mild oxidation (generation of aldehyde groups), carbonyldiimidazole (CDI) or by other methods known. Optimal biotin coverage is determined by titration in preliminary tests in order to maximize streptavidin binding capacity while maintaining the matrix properties of agarose (melting and gel formation behavior, low unspecific binding).

Component 1:
  Ultra-low gelling temperature agarose A2576 solution (1% w/v), biotin-labelled
  nuclease-free water
  2% (v/v) Polyvinylalcohol The constituents of component 1 are pipetted together, shaken briefly on a vortex mixer and centrifuged. Subsequently, the mixture is incubated at 72° C. for 30 min under gentle agitation (100 rpm) in order to melt the agarose and obtain a homogenous agarose solution which is then kept at 42° C. until further use.

A (2-Hydroxypropyl)-y-cyclodextrine stock solution (100%) was also prepared in nuclease-free water using Cavasol W7 or W8 (Sigma) and stored at room temperature. The final mixture for PCR accommodating all reagents to be encapsulated contained the following:

Component 2:
  1.25 U/µl Hot Start Taq DNA Polymerase (biotechrabbit GmbH)
  4.0 mM dNTPs (biotechrabbit GmbH)
  8.0 µM sense primer (5'-GCAGTGGCGCCCGAACAGG-3') (Metabion International AG)
  8.0 µM antisense primer (5'-ACTGACGCTCTCGCACC-CATCT-3') (Metabion International AG)
  8.0 µM Taq-Man probe (5'-Cy5-CTCCGACGCAACGGGCTCG-BHQ3-3') (Metabion International AG) or 10× EvaGreen® Fluorescent DNA Stain (Jena Bioscience GmbH)
  Sodiumpolyphosphate (Merck)
  9% (w/v) (2-Hydroxypropyl)-y-cyclodextrine (Sigma)

The reagent mix was spray-dried using the Nano Spray Dryer B-90 (Büchi Labortechnik GmbH) to obtain nanoparticle-sized reagent. Nanoparticles were subsequently dried under vacuum just before dispersing them in the triglyceride Softenol 3118 (IOI Oleo GmbH) which is a tristearine, at a maximum concentration of 10% (w/v) by ultrasonic treatment at elevated temperature (80-90° C.) using the S-450D Digital Sonifier (Branson).

Generation of Monodisperse Microcapsules
Component 3:
  a.
    mineral oil/paraffin oil (Sigma)
    2% (w/v) Span80
  OR
  b.
    HFE 7500 (Dolomite Microfluidics)
    2-5% Picosurf 1 (Dolomite MIcrofluidics)

Monodisperse agarose microparticle containing triglyceride-embedded reagent can be fabricated in a one-step process of double emulsion formation using a simple double flow-focus device (Dolomite Microfluidics). In particular, two Dolomite Droplet Junction chips, one being a plain glass chip (hydrophilic, 100 µm) and a second one being of hydrophobic nature (190 µm) are mounted into a chip holder, using the linear connector for inlet and outlet of fluids. By selecting this chip order, appropriate channel surface wettability for stable oil/water/oil two-phase droplet formation is achieved. Triglyceride-embedded reagent with a wax to reagent ratio of maximum 10:1 and component 1 (cooled to 42° C.) as well as component 3 are both pre-filtered with a 2 µm filter before placing them into the P-Pump (Mitos) of the droplet system. The temperature control unit for chip 1 is set above the congealing temperature of the triglyceride (75° C.) and to 42° C. for chip 2. The fluid lines are primed at 2000 mbar for 1 min using the Flow Control Software. Both sides of the linear connector are connected to the chip using the interface. A flow rate ratio of 1:10:100 inner, middle to outer respectively is adjusted. Flow rates need to be optimized for stable two-phase droplet formation. Parameters are monitored with the Dolomite Flow Control Advanced Software. The triglyceride containing the reagent is sheared at the first junction producing either a jet that extends into the second junction forming a coaxial jet, which is cut again or droplets that are encapsulated at the second junction. O/W/O droplets are collected on ice to initiate congealing of the tryglyceride and solidification of the agarose.

The process results in agarose microcapsules of app. 190 µm diameter with a triyglyceride embodiment containing a defined volume of dried reaction mix. The functional microcapsules are extracted from the oil phase by centrifugation (200×g) through a sieve structure (SEFAR PETEX® mesh (w=44 µm)) and are washed 5× with 0.1% (v/v) TritonX-100 prior to resuspension in nuclease-free water, 0.02% Sodium Azide (v/v) and storage in the fridge at 7° C. for further processing.

In the case of droplet generation in HFE 7500 (2-5% Picosurf 1), 50 µl of 1% (v/v) Triton X-100 in water are pipetted to the particles.

The tube is then centrifuged at 2000 g for 1 min. The oil phase (bottom) and aqueous phase (top) are now well separated with an interphase containing the particles. 200 µl of a density gradient medium (Optiprep, Axis shield) is now pipetted slowly to the tube. It is important to prevent excessive mixing of the aqueous phase with the density gradient medium. Ideally, most of the density gradient medium slips under the particle phase. The tubes are centrifuged for 2 min at 2000 g. Afterwards, the density gradient medium phase is situated between the oil phase ad the particle phase. The particle phase can now be transferred to a new tube. In this step care need to be taken not to transfer any of the oil volume and as small of a volume as possible of the density gradient medium to the new tube.

1 mL of 0.1% (v/v) Triton X-100 in PCR-grade water is added to the tube containing the particles. The volume is mixed and centrifuged at 2000 g for 2 min. The particles are now pelleted to the bottom of the tube. The supernatant is removed leaving the particles in the tube. 1 mL of 0.1% (v/v) Triton X-100 is added to the tube again and the process of washing is repeated 5 times. Finally, the particles are taken up in a volume of PCR-grade water, 0.02% Sodium Azide (v/v) or buffer that is suitable for the following processes.

Alternatively wax beads containing submicron sized dried reagent were manufactured via spray drying using a Büchi Mini Spray Dryer B-290 resulting in beads with an average diameter of 10 µm. A defined amount of triglyceride wax beads was then re-suspended in molten agarose below the melting point of the wax. For generating a homogeneous dispersion of wax beads, agarose was initially suspended in a 50% ethanolic solution and gently agitated during dispensing. Microcapsules were then generated by dispensing agarose droplets of 200 µm diameter into mineral oil using a MD-K-140 Dispenser Head (Microdrop).

Coating Microcapsules with Streptavidin
  Micocapsules are washed 1× with washing buffer (20 mM Trix-HCl, 22 mM KCl, 22 mM NH$_4$Cl, 3 mM MgCl$_2$, 5% (v/v) glycerol). Coating of the microcapsules with streptavidin is accomplished in the same buffer. The concentration of streptavidin is selected such no accessible biotin remains on the surface of the microcapsules. In any case Streptavidin is applied in excess in order to avoid cross-linking of the microcapsules. Optimal streptavidin concentration has been determined in preliminary tests with labelled Streptavidin by determining a plateau surface coverage. After coupling with streptavidin the microcapsules are washed several times on 44 µm SEFAR PETEX centrifugation units with a wash buffer without streptavidin. Subsequently, the microcapsule concentration is determined by counting under a microscope in a DHC-N01 (Neubauer Improved) counting chamber (INCYTO) or cytometrically on the CytoFlex flow cytometer (Beckman Coulter). The degree of labelling/coating is also assessed spectrometrically making use of the monochlorotriazinyl dye label. Aliquots containing approximately 100,000 beads are resuspended in a 9% (w/v) (2-Hydroxypropyl)-γ-cyclodextrine solution and are lyophilized or alternatively vacuum dried.

Embodiment 2: Application of Mono Disperse Microcapsules for Performing Digital PCR Analyte Capturing Purified HIV-1 RNA (subtype O) labeled with biotin by reverse transcription is enriched on streptavidin-modified reagent-encapsulated hydrogel microparticle. The entire volume of the reverse transcription (RT) reaction is added to a defined amount of lyophilized or dried microcapsules. The beads are carefully re-suspended and incubated with the RT-reaction mix. Microcapsules are allowed to absorb a part of the applied liquid, swell and bind the biotin-labelled cDNA. In order to avoid agglomerates ultrasound may be used. Subsequently the suspension is applied to a centrifugation tube equipped with SEFAR PETEX® tissue (w=44 µm). The supernatant is removed by centrifugation of the column at 300×g. For washing, the previously used wash buffer is added to the column and also centrifuged at 300×g. Washing is repeated several times and the microcapsules are ultimately taken up in component 4. In this step the microcapsules bind the analyte from the solution and take up remaining components necessary for the PCR by diffusion.

Component 4 consists of the following reagents (final concentrations):
20 mM Trix-HCl, 22 mM KCl, 22 mM NH$_4$Cl, 3 mM MgCl$_2$, 5% (v/v) glycerol
MgCl$_2$ [Invitrogen] or MgSO$_4$ [Sigma]
Biotin-labeled cDNA template with the following sequence:

5'-Bio-CAGTGGCGCCCGAACAGGGACTTTAAAGAGAAAGTGAAACCAG

GGAAGAAAACCTCCGACGCAACGGGCTCGGCTTAGCGGAGTGCACCTGCT

AAGAGGCGAGAGGAACTCACAGAGGGTGAGTAATTTTGCTGGCAGTGGCC

AGACCTAGGGGAAGGGCGAAGTCTCTAGGGGAGGAAGATGGGTGCGAGAG

CGTCAGT-3'

Compartmentation by Transferring to Non-Aqueous Phase

Microcapsules are transferred into a non-aqueous phase by washing them 3 times with paraffin oil (Sigma) containing surfactant Triton-X 100 (0.1% w/w) (Sigma) and emulsifier ABIL EM-90 (3% w/w) (Evonik Industries) or others to avoid coagulation of the microcapsules. Washing is performed by centrifugation at 200×g for 1 min using a centrifugation tube equipped with SEFAR PETEX® tissue (w=44 µm).

Micro-compartments with a defined volume are created by dispersing microcapsules in a fluorocarbon oil, e.g. PicoSurf™ 5% dispersed in Novec 7500 oil (Dolomite Microfluidics). Instead of a heavy fluorocarbon oil a light mineral oil with emulsifier, e.g. Paraffin oil (Sigma) with 5% (w/w) Span 80 (Sigma) may be applied.

The complete aqueous phase is brought into contact with an excess of oil in an Eppendorf tube. Ultrasound is applied for one minute using the Sonifier™ S-450 and the Ultrasonics Sonifier™ Cup Horn (Branson). Both the microcapsules loaded with the cDNA and the supernatant of component 3 are dispersed and emulsified in the oil phase. The generated aqueous droplets of the supernatant of component 3 and the microcapsules differ significantly in their volume, the droplets having a much smaller volume. The generated emulsion is pipetted onto SEFAR PETEX® tissue with a mesh width of 44 µm. Smaller droplets as well as larger droplets that may not contain microcapsules are removed by mild centrifugation. Repeated washing with the same oil removes all liquid droplets. By introducing the filter unit into a suitable centrifuge tube in the opposite orientation the concentrated microcapsules are extracted from the sieve.

Release of Reagent & Direct Amplification of Captured cDNA in Microcompartments

The oil with the microcapsules is transferred into a detection chamber with an area of approximately 2 cm$^2$ and a layer thickness of approximately 50-1000 µm. The opposite surfaces of the chamber are made of transparent hydrophobic material. Microcapsules suspended in paraffin oil are forced to form a monolayer whether by the dimension of the reaction chamber or other means such a flexible tubing. Thus the microcapsules provide evenly spaced micro reaction containers for the subsequent digital PCR.

Microcapsules are subjected to temperature cycling by using a PELTIER element 30×30×4.7 mm, 19.3 W (Quick-Ohm, Küpper & Co. GmbH, #QC-71-1.4-3.7M). The reaction chamber is heated 5° C. above the melting temperature of the wax for at least 2 min to smoothly release the dried reagents into the hydrogel matrix prior to melting of the agarose and transformation of the microcapsules into liquid droplets surrounded by oil. The amplification of individual cDNA molecules takes place in the resulting micro-reaction compartments.

The thermal conditions applied are:

Initial denaturation for 2 min at 95° C. (may be enough to release the reagents and melt the agarose particles) followed by 45 cycles of Denaturation at 95° C. for 15 sec, Annealing at 65° C. for 15 sec and Extension at 72° C. for 30 sec. Upon completion or the thermal protocol the content of the chamber is imaged at room temperature in transmitted white light and fluorescence mode with excitation λexc=470 nm and long pass emission of >496 nm or excitation λexc=660 nm and emission of 670 nm. The total number of microcapsules and the number of those with a fluorescence signal above a defined intensity threshold are determined. The threshold value is derived from previously performed amplification reactions without template. The number of templates in the reaction is determined by applying the determined numbers of positive and negative droplets to Poisson statistics.

Embodiment 3: Manufacturing of Macroscopic Reagent Capsules

In an alternative approach capsules with a diameter of app. 1.5 mm were generated using the following protocol.

Complete PCR reagent mix (see embodiment 1) was freeze dried to form reagent pellets of app. 0.8 mm diameter. Wax coating was applied by dip-coating individual reagent pellets in molten paraffin at a temperature slightly above the melding point of the paraffin. Afterwards individual coated pellets were exposed to oxygen low temperature plasma treatment to lower the contact angle of the wax surface. High gelling agarose was biotinylated using the same protocol as in embodiment 1 and pellets were then transferred to cavities containing a defined agarose volume which was molten and maintained close to the gelling temperature of the agarose. Agarose was then picked with a vacuum pipette washed and coated with streptavidin as described in embodiment 1. Capturing of reagent and washing was done similar to the protocol in embodiment 2 while the capsules were gently incubated and flushed with the buffer. Transfer of the capsules into non-aqueous phase and washing with mineral oil was performed by flushing the capsule.

PCR was done similar to embodiment 2.

Embodiment 4: Fabrication and Use of pNIPAM-Based Mono Disperse Amplification Microcapsules for Performing a Combined Target Capture/Digital PCR Assay This example describes the use of pNIPAM-based mono disperse amplification microcapsules to perform a combined nucleic acid target capture/digital PCR assay. In this application the microcapsules provide several functionalities:

1. They provide binding groups and the outer or inner and outer surface to capture the assay target in the place, where in further steps the amplification will occur.
2. They provide a matrix that can be filled with aqueous solutions and emptied easily making use of the LCST behaviour of the pNIPAM polymer.
3. The polymer also provides a matrix allowing to bring the aqueous phase contained in the particles into an oil emulsion. The advantage of using the microcapsules as a matrix is that a homogeneous size distribution of water volumes in oil can be achieved without the need of using a microfluidic or other complicated technical device.
4. The pNIPAM microcapsules contain all reagents necessary for performing the PCR amplification embedded in water impermeable cores In this experiment a cDNA created in a separate step was used as PCR template. When using RNA as template, the particles could be filled with an RT-PCR reaction mix and the whole process of RT-PCR process could be performed DAB based.

Generation of pNIPAM Microcapsule Solutions
Component 1 (Aqueous Polymerisation Phase):
Creation of Biotin-Modified Monomer-Mix:

A Biotin-modified acrylic monomer was created in a separated reaction. The reaction mix consisted of Acrylic acid N-Hydroxysuccinimide ester (an activated aminoreactive Acrylic acid monomer) and Biotin-dPEG7-NH2 (A Biotin-derivative modified with a PEG7 spacer arm terminated with an ammino group)

|  | 2.5% Biotin-modified monomer mix |
|---|---|
| PBS to a total Volumen of (mL) | 0.114 |
| Acrylic acid N-Hydroxysuccinimide ester (mg) | 2.8 |
| Biotin-dPEG7-NH2 (mg) | 10.0 |

The reaction mix was incubated for 30 minutes at 25° C. This mix was used without any further purification in pNIPAM polymerisation reactions.

Components Per mL Polymerisation Mix

|  | Reaction mix |
|---|---|
| 20% (w/v) N-Isopropylacrylamide (NIPAM) | 250 µl |
| 2.5% (w/v) N,N'-Methylenebisacrylamide | 20 µl |
| 2.5% Biotin-modified monomer | 10 µl |
| 5% (w/v) Ammonium persulfate | 150 µl |
| Deionised water | 570 µl |

Component 2 (Reagent Phase):

A (2-Hydroxypropyl)-γ-cyclodextrine stock solution (100%) was also prepared in nuclease-free water using Cavasol W7 or W8 (Sigma) and stored at room temperature. The final mixture for PCR accommodating all reagents to be encapsulated contained the following:

1.25 U/µl Hot Start Taq DNA Polymerase (biotechrabbit GmbH)
4.0 mM dNTPs (biotechrabbit GmbH)
8.0 µM sense primer (5'-GCAGTGGCGCCCGAACAGG-3') (Metabion International AG)
8.0 µM antisense primer (5'-ACTGACGCTCTCGCACC-CATCT-3') (Metabion International AG)
8.0 µM Taq-Man probe (5'-CF647-CTCCGACGCAACGGGCTCG-BHQ3-3') (Metabion International AG) or 10× EvaGreen® Fluorescent DNA Stain (Jena Bioscience GmbH)
Sodiumpolyphosphate (Merck)
9% (w/v) (2-Hydroxypropyl)-γ-cyclodextrine (Sigma)

The reagent mix was spray-dried using the Nano Spray Dryer B-90 (Büchi Labortechnik GmbH) to obtain nanoparticle-sized reagent. Nanoparticles were subsequently dried under vacuum just before dispersing them in the tristearin Softenol 3118 (IOI Oleo GmbH) at a maximum concentration of 10% (w/v) by ultrasonic treatment at elevated temperature (80-90° C.) using the S-450D Digital Sonifier (Branson).

Component 3 (Oil Phase for Polymerisation):

| Pico-Surf (TM) 1, 10 ml, 2% in Novec 7500 | 1485 µl |
|---|---|
| N,N,N',N'-Tetramethylethylenediamine | 15 µl |

Generation of Monodisperse Microcapsules

Monodisperse pNIPAM-based (=poly(N-isopropylacrylamide)-based) microparticle containing tristearin-embedded reagent can be fabricated in a one-step process of double emulsion formation using a simple double flow-focus device (Dolomite Microfluidics). In particular, two Dolomite Droplet Junction chips, one being a plain glass chip (hydrophilic, 100 µm) and a second one being of hydrophobic nature (190 µm) are mounted into a chip holder, using the linear connector for inlet and outlet of fluids. By selecting this chip order, appropriate channel surface wettability for stable oil/water/oil two-phase droplet formation is achieved. Component 2 with a wax to reagent ratio of maximum 10:1 as well as component 1 and component 3 are both pre-filtered with a 2 µm filter before placing them into the P-Pump (Mitos) of the droplet system. The temperature control unit for chip 1 is set above the congealing temperature of the Softenol (75° C.) and to 25° C. for chip 2. The fluid lines are primed at 2000 mbar for 1 min using the Flow Control Software. Both sides of the linear connector are connected to the chip using the interface. A flow rate ratio of 1:10:100 inner, middle to outer respectively is adjusted. Flow rates need to be optimized for stable two-phase droplet formation. Parameters are monitored with the Dolomite Flow Control Advanced Software. The triglyceride containing the reagent is sheared at the first junction producing droplets that are encapsulated at the second junction. O/W/O droplets are collected in a tube at 20° C. to initiate congealing of the tryglyceride and polymerization of the pNIPAM.

The process results in pNIPAM microcapsules of app. 190 μm diameter with a tristearin embodiment containing a defined volume of dried reaction mix.

Recovery of the Microcapsules and Transfer to the Aqueous Phase

After the polymerisation process is finished as much as possible of the oil phase is gently withdrawn from the droplet reservoir using a pipette paying attention not to remove the pNIPAM particles. Then, 50 μl 1% (v/v) Triton X-100 in water are pipetted to the particles. The volume is mixed by pipetting up and down such that the particles do not stick to the walls of the droplet chip. The volume is transferred to an Eppendorf Tube and the process is repeated once again. The transfer process can be monitored under a binocular microscope to prevent a major loss of particles in this step.

The tubes are then centrifuged at 2000 g for 1 min. Oil phase (bottom) and aqueous phase (top) are now well separated with an interphase containing the particles. 200 μl of a density gradient medium (Optiprep, Axis shield) is now pipetted slowly to the tube. It is important to prevent excessive mixing of the aqueous phase with the density gradient medium. Ideally, most of the density gradient medium slips under the particle phase. The tubes are centrifuged for 2 min at 2000 g. Afterwards, the density gradient medium phase is situated between the oil phase ad the particle phase. The particle phase can now be transferred to a new tube. In this step care need to be taken not to transfer any of the oil volume and as small of a volume as possible of the density gradient medium to the new tube.

1 mL of PBS, 0.1% (v/v) Triton X-100 is added to the tube containing the particles. The volume is mixed and centrifuged at 2000 g for 2 min. The particles are now pelleted to the bottom of the tube. The supernatant is removed leaving the particles in the tube. 1 mL of PBS, 0.1% (v/v) Triton X-100 is added to the tube again and the process of washing is repeated 5 times. Finally, the particles are taken up in PBS with 0.1% Triton X-100.

Coating of pNIPAM Based Monodisperse Microcapsules with Streptavidin

Coating of the microcapsules with streptavidin is accomplished in the washing buffer used before. The concentration of streptavidin is selected such that no accessible Biotin remains on the surface of the microcapsules. In any case Streptavidin is applied in excess in order to avoid cross-linking of microcapsules. Optimal streptavidin concentration has been determined in preliminary tests with labelled Streptavidin by determining a plateau surface coverage.

Incubation Mixes:

|  | Per 100.000 particles |
|---|---|
| Streptavidin (2 mg/ml) in PBS, 0.1% Triton X-100 | 250 μl |

The coupling is done in an Eppendorf Thermoshaker with agitation of the solution at 350 rpm for 30 min and 5 temperature oscillations between 25° C. and 37° C. After coupling with Streptavidin the microcapsules are washed to remove excess Streptavidin. 1 mL of PBS, 0.1% (v/v) Triton X-100 is added to the tube containing the particles. The volume is mixed and the temperature is set to 40° C. The particles shrink and the inner liquid is expelled. Subsequently the particles are centrifuged at 2000 g and 40° C. for 2 min. The particles are now pelleted to the bottom of the tube. The supernatant is removed leaving the particles in the tube. 1 mL of 20° C. PBS, 0.1% (v/v) Triton X-100 is added to the tube. The particle swell and take up the wash buffer. The volume is mixed and the temperature is set to 40° C. again. This process of washing is repeated 5 times. Finally, the particles are taken up in water with 0.01% Triton X-100. Subsequently, the concentration of the microcapsules is determined by counting under a microscope in a DHC-N01 (Neubauer Improved) counting chamber (INCYTO) or cytometrically on the CytoFlex flow cytometer (Beckman Coulter).

Preparation of Biotin-Modified HIV-1 cDNA Template

Biotinylated HIV-1 cDNA was generated by performing a reverse transcription in the presence of the PCR reverse primer. The reaction mix was incubated for 15 minutes at 50° C. and the reaction was stopped by heating the reaction mix to 70° C. for 10 minutes.

Incubation Mix:
  Purified HIV-1 RNA ($\sim 10^6$ copies)
  1 μM biotinylated reverse primer 5' Biotin-ACT GAC GCT CTC GCA CCC ATCT-3'
  1× reaction buffer (cDNA Synthesis Kit Thermo Fisher)
  dNTPs (1 mM each)
  RevertAid Reverse Transcriptase (200 U, Thermo Fisher)

The cDNA reaction mix is diluted with PBS 0.1% Triton X-100 to yield a final concentration of $\sim 10^4$ cp/μl.

Capture of a HIV-1 cDNA Targets on Streptavidin-Modified Microcapsules

HIV-1 RNA labelled with biotin by reverse transcription is captured on streptavidin-modified microcapsules ~100000 pNIPAM microcapsules were transferred to a reaction tube and heated to 50° C. to expel the liquid phase from the particles. The particles are briefly spun at 2000 g and held at 40° C. The shrunken and pelleted particles stick together tightly such that the expelled liquid can be removed completely from the pellet. Then, the following Incubation mix is added to the pellet
  1 μl cDNA mix ($\sim 10^4$ copies)
  49 μl PBS with 0.1% Triton X-100

Capturing is done in an Eppendorf Thermoshaker with agitation of the solution at 350 rpm for 30 min and 5 temperature oscillations between 25° C. and 37° C.

After target capturing, the microcapsules heated to 50° C. to expel the liquid phase from the microcapsules. The particles are briefly spun at 2000 g and held at 40° C. The shrunken and pelleted microcapsules stick together tightly such that the expelled liquid can be removed completely from the pellet.

10 μl of water with 0.01% Tritonx-100 was added to the microcapsules. The water volume needs to be smaller than the volume that can be taken up by the particles. This depends mainly on the number and size of the particles. In this example the particles used were capable of taking up a volume of 12 μl.

Compartmentalization by Dispersing of Microcapsules in Oil

Micro-compartments with a defined volume are created by dispersing microcapsules in a fluorocarbon oil, e.g. PicoSurf™ 5% dispersed in Novec 7500 oil (Dolomite Microfluidics, #3200214. Instead of a heavy fluorocarbon oil a light mineral oil with emulsifier, e.g. Mineral oil (Sigma-Aldrich, #M5904 Sigma) with 5% (w/w) Span 80 (Sigma Aldrich, #85548) may be applied.

The microcapsules pellet is brought in contact with an excess of oil in an Eppendorf tube. Ultrasound is applied until the pellet is dispersed and the microcapsules are distributed homogenously. The pNIPAM microcapsules loaded with HIV-1 cDNA target are now emulsified in the oil phase. The oil with the microcapsules is transferred into a detection chamber with an area of approximately 2 cm$^2$ and a layer thickness of approximately 1 mm. The opposite surfaces of the chamber are made of transparent hydrophobic material. If a fluorocarbon oil is used, the microcapsules assemble as a monolayer (dense packing) on the hydrophobic upper surface due to the difference in density between the beads and the oil. If a mineral oil is applied the microcapsules will accumulate at the lower surface. Thus the microcapsules provide micro reaction containers for the subsequent digital PCR.

Amplification Reaction in Micro-Compartments

Microcapsules suspended in oil are subjected to the temperature cycling in the same chamber on a PELTIER element 30×30×4.7 mm, 19.3 W (Quick-Ohm, Küpper & Co. GmbH, #QC-71-1.4-3.7M). The microcapsules are heated to a temperature of 80° C. which leads to shrinking of the pNIPAM capsules and melting of the Softenol. The embedded reagent is exposed to the water phase. This process is supported by several cycles of thermal cycling between 25° C. and 80° C. The reagents dissolve in the water volume expelled from the pNIPAM at elevated temperatures. Single aqueous droplets around the condensed microcapsules are formed which serve as micro-reaction compartments. The reaction mix comes in contact with the captured individual cDNA targets which are amplified in the micro-compartments during PCR.

The thermal conditions applied are:

Initial denaturation for 2 min at 95° C. followed by 45 cycles of Denaturation at 95° C. for 15 sec, Annealing at 65° C. for 15 sec and Extension at 72° C. for 30 sec. Upon completion or the thermal protocol the content of the chamber is imaged at 21° C. in transmitted white light and fluorescence mode with excitation λexc=650 nm and long pass emission of >670 nm. The total number of micro-compartments and the number of those with a fluorescence signal above a defined intensity threshold are determined. The threshold value is derived from previously performed amplification reactions without template. The number of templates in the reaction is determined by applying the determined numbers of positive and negative droplets to Poisson statistics.

The features of the present invention disclosed in the specification, the claims, and/or in the accompanying drawings may, both separately and in any combination thereof, be material for realizing the invention in various forms thereof.

The invention claimed is:

1. A microcapsule having a size in a range of from 1 μm to 2000 μm for detecting and/or quantitating an analyte in a sample, said microcapsule comprising:
reagents comprising an amplification enzyme, one or more nucleic acid primers, nucleotides, one or more salts and buffers, and optionally, one or more detection agents; wherein said reagents are in a dry state;
a porous matrix surrounding said reagents, said porous matrix having means to receive an analyte to be detected and/or quantitated; wherein said dry state reagents are separated from said porous matrix by a barrier;
wherein said means to receive an analyte to be detected and/or quantitated comprises an interstitial pore space that is dimensioned to accommodate a liquid sample containing said analyte; and
wherein said interstitial pore space is dimensioned to accommodate sufficient liquid sample to dissolve said dry reagents;
wherein said means to receive an analyte to be detected and/or quantitated is either said interstitial pore space to accommodate said liquid sample or a combination of said interstitial pore space and one or more capture agents which, upon exposure of said microcapsule(s) to a sample surrounding said microcapsule and containing the analyte to be detected and/or quantitated, are capable of selectively and specifically binding such analyte, wherein said one or more capture agents are attached to a portion of said microcapsule exposed to the surroundings of said microcapsule;

wherein the microcapsule further comprises
one or more water impermeable cores containing and/or embedding said reagents, and thus, separating said dry state reagents from said porous matrix; and
a porous hydrophilic shell forming said porous matrix and surrounding said one or more water impermeable cores; wherein said one or more capture agents are attached to said porous hydrophilic shell; and
wherein said porous hydrophilic shell comprises a hydrogel-forming agent or a thermoresponsive polymer.

2. The microcapsule according to claim 1, wherein said water impermeable core comprises a material suitable for containing and/or embedding said reagents and wherein said material encompasses said reagents and isolates them from other parts of said microcapsule.

3. The microcapsule according to claim 1, wherein said water impermeable core contains and/or embeds said reagents, in a dry state, and separates them from said porous matrix.

4. The microcapsule according to claim 1, wherein said one or more capture agents are selected from the group consisting of:
antibodies,
antibody fragments,
non-antibody proteins capable of specifically binding an analyte or analyte complex,
biotin,
a peptide with the sequence-Ala-Trp-Arg-His-Pro-Gln-Phe-Gly-Gly-COOH (SEQ ID NO: 1) or -Asn-Trp-Ser-His-Pro-Gln-Phe-Glu-Lys-(SEQ ID NO: 2),
digoxigenin,
dinitrophenol, and
nucleic acids, nucleic acid analogue-tags or similar chemical moieties capable of being specifically bound, with an affinity in the range of from $K_D=10^{-8}$ to $10^{-15}$ M, by antibodies, antibody fragments, nucleic acids, or non-antibody proteins, or
said one or more capture agents are selected from hydrophobic structures capable of specifically binding hydrophobic molecules or molecules with hydrophobic groups.

5. The microcapsule according to claim 1, wherein said reagents additionally include one or more detection agents, wherein said one or more detection agents is/are selected from antibodies or antibody fragments, nucleic acids, non-antibody proteins, each of them optionally being labelled with a suitable reporter molecule or a mixture of reagents capable of starting a chemical reaction that produces an optically or otherwise detectable signal indicating the presence of an analyte to be detected.

6. A method of detecting and/or quantitating an analyte in a sample, said method comprising:
i) providing a microcapsule according to claim 1;
ii) exposing said microcapsule to an aqueous sample surrounding said microcapsule and containing or suspected of containing an analyte to be detected and/or quantitated;
iii) removing said microcapsule from said aqueous sample and transferring said microcapsule to a non-aqueous phase;
iv) dissolving or disrupting said microcapsule to generate an aqueous droplet in a non-aqueous environment, wherein said aqueous droplet contains said reagents in dissolved form; and
v) performing a reaction of generating and/or amplifying a signal within said aqueous droplet, wherein a signal is only generated and/or amplified if said analyte has been present in said sample.

7. The method according to claim 6, wherein in step iv) said microcapsule is dissolved or disrupted by means selected from mechanical means, chemical cleavage, temperature change, pH change, solvent change, application of an electric field, application of a magnetic field, and exposing said microcapsule to electromagnetic radiation.

8. The method according to claim 6, wherein said microcapsule comprises a porous hydrophilic shell, and said porous hydrophilic shell comprises a LCST thermoresponsive polymer.

9. The method according to claim 8, wherein said method includes, between steps ii) and iii), an additional step
ii)a heating said microcapsule to a temperature above the lower critical solution temperature (LCST) of said LCST thermoresponsive polymer and subsequently cooling or allowing to cool said microcapsule to a temperature below the lower critical solution temperature (LCST) of said LCST thermoresponsive polymer, in order to achieve an enrichment of analyte bound to said microcapsule, and performing such step ii) a n-times, wherein n is an integer from 1 to 1000 and
ii)b washing said microcapsule in an aqueous solution to remove unbound analyte,
wherein if step ii)b is performed in addition to step ii.a, it is performed either before or after step ii)a.

10. A method of preparing microcapsules for detecting and/or quantitating an analyte in a sample, said microcapsules being as defined in claim 1, said method comprising the steps:
a) providing an aqueous solution of said reagents, wherein said aqueous solution of said reagents, in addition to said reagents, further optionally, comprises one or several protective agents for protecting one or more of said reagents in said aqueous solution;
b) drying said aqueous solution of a), thereby generating dried reagents;
c) incorporating said dried reagents into a material suitable for containing and/or embedding said reagents, such that said material encompasses said reagents and isolates them;
d) generating microparticles from the product of c) by drying said product of c), thereby generating impermeable cores;
e) incorporating said impermeable cores into a porous hydrophilic shell forming a porous matrix and surrounding said one or several impermeable cores by
incorporating said impermeable cores into a hydrogel-forming agent and inducing said hydrogel-forming agent to form a hydrogel around said impermeable cores, or
incorporating said impermeable cores into precursors/monomers of a thermoresponsive polymer and inducing said precursors/monomers to polymerise into a thermoresponsive polymer around said impermeable cores, or
incorporating said impermeable cores into a preformed thermoresponsive polymer and allowing said preformed thermoresponsive polymer to form around said impermeable cores;
f) Optionally, coupling one or several capture agents to said porous hydrophilic shell surrounding said one or several impermeable cores, thereby generating microcapsule(s) with one or several capture agents attached, wherein said one or several capture agents, upon exposure of said microcapsule(s) to a sample surrounding said microcapsule and containing an analyte to be detected and/or quantitated, are capable of selectively and specifically binding such analyte;
g) optionally, collecting said microcapsules; and
h) further optionally washing and/or drying, preferably freeze-drying, said microcapsules.

11. The microcapsule according to claim 1, wherein said hydrogel-forming agent is selected from the group consisting of a) synthetic polymers; b) silicone-based polymers; c) naturally occurring polymers selected from the group consisting of polysaccharides, gums; polypeptides, collagens, gelatins, poly-amino acids, polynucleotides; and combinations thereof; and said thermoresponsive polymer is an LCST thermoresponsive polymer, selected from poly(N-isopropylacrylamide) (PNIPAm), poly[2-(dimethylamino)ethyl methacrylate] (pDMAEMA), hydroxypropylcellulose, poly(vinylcaprolactame) (P(VCL), and polyvinyl methyl ether; or said thermoresponsive polymer is a thermoresponsive polymer having an upper critical solution temperature (UCST), selected from the group consisting of poly(N-acryloyl glycinamide) (PNAGA), poly(allylamine)-co-poly(allylurea) and its derivatives, poly(methacrylamide), poly(N-acryloylaspargineamide), poly(N-methacryloylglutamineamide), poly(acrylamide)-co-(acrylonitrile), poly(sulfobetaine)s, and poly(phosphorylcholine)s.

12. The microcapsule according to claim 2, wherein said material is selected from the group consisting of paraffins, triglycerides and waxes.

13. The method according to claim 6, said reaction performed in step v) is a nucleic acid amplification reaction selected from PCR and isothermal amplification reactions.

14. The method according to claim 7, wherein said microcapsule is dissolved or disrupted by a temperature increase.

* * * * *